United States Patent
Burt et al.

[11] Patent Number: 5,991,444
[45] Date of Patent: *Nov. 23, 1999

[54] METHOD AND APPARATUS FOR PERFORMING MOSAIC BASED IMAGE COMPRESSION

[75] Inventors: Peter J. Burt, Princeton; Michal Irani, Princeton Junction; Stephen Charles Hsu, E. Windsor; Padmanabhan Anandan, Lawrenceville, all of N.J.; Michael W. Hansen, New Hope, Pa.

[73] Assignee: Sarnoff Corporation, Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/882,280

[22] Filed: Jun. 25, 1997

Related U.S. Application Data

[62] Division of application No. 08/339,491, Nov. 14, 1994, Pat. No. 5,649,032.

[51] Int. Cl.⁶ .................................................. G06K 9/36
[52] U.S. Cl. ........................................ 382/232; 382/284
[58] Field of Search ................................. 382/100, 284, 382/294, 232; 358/450, 426; 348/564, 588, 385, 388; 345/115, 435; 395/111

[56] References Cited

U.S. PATENT DOCUMENTS

| | | | |
|---|---|---|---|
| 4,835,532 | 5/1989 | Fant | 340/728 |
| 5,034,986 | 7/1991 | Karmann et al. | 382/1 |
| 5,040,067 | 8/1991 | Yamazaki | 358/183 |
| 5,140,416 | 8/1992 | Tinkler | 358/88 |
| 5,187,754 | 2/1993 | Currin et al. | 382/54 |
| 5,258,837 | 11/1993 | Gormley | 358/140 |
| 5,262,856 | 11/1993 | Lippman et al. | 358/136 |
| 5,325,449 | 6/1994 | Burt et al. | 382/56 |
| 5,339,104 | 8/1994 | Hong | 348/155 |
| 5,416,606 | 5/1995 | Katayama et al. | 358/467 |
| 5,633,683 | 5/1997 | Rosengren et al. | 348/385 |
| 5,649,032 | 7/1997 | Burt et al. | 382/284 |
| 5,657,402 | 8/1997 | Bender et al. | 382/284 |

OTHER PUBLICATIONS

Michal Irani, "Isolating Multiple 2D Image Motions for Image Enhancement and for 3D Motion Analysis", Hebrew University of Jerusalem, 1993.

Burt et al., "Enhanced Image Capture Through Fusion", International Conference on Computer Vision Proceedings, 1993.

Burt et al., "Merging Images Through Pattern Decomposition", Applications of Digital Processing VIII, SPIE, vol. 575, pp. 173–181, 1985.

(List continued on next page.)

*Primary Examiner*—Andrew W. Johns
*Attorney, Agent, or Firm*—William J. Burke

[57] ABSTRACT

A system for automatically generating a mosaic from a plurality of input images. The system sequentially executes an image alignment process, an editing process, and a combining process such that, from a sequence of images, the system automatically produces a seamless mosaic for various applications. Illustrative applications for the mosaic include: (1) a mosaic based display system including an image printing system, (2) a surveillance system and (3) a mosaic based compression system. The mosaic based display system permits a system user to display, manipulate and alter a mosaic. The mosaic based compression system exploits the temporal and spatial redundancy in image sequences and efficiently compresses the image information. The compression system can be used for compressing image information for storage in a storage device or can be used for compressing image information for transmission through a band-limited transmission channel. The surveillance system combines the mosaic construction system, the compression system and the display system into a comprehensive system for remote motion detection.

27 Claims, 14 Drawing Sheets

OTHER PUBLICATIONS

Burt et al., "A Multiresolution Spline With Application to Image Mosaics", ACM Transactions on Graphics, vol. 2, No. 4, pp. 217–236, Oct. 1983.

Bove et al., "Real–Time Decoding and Display of Structured Video", IEEE ICMCS, May 1994.

Lundmark et al., "Image Sequence Coding at Very Low Bitrates: A Review", IEEE Transactions on Image Processing, vol. 3, No. 5, pp. 589–609, Sep. 1994.

McLean, "Structured Video Coding", Massachusetts Institute of Technology, 1991.

Bergen et al., "Hierarchical Model–Based Motion Estimation", Proceedings of European Conference on Computer Vision, Mar. 23, 1992.

Hartley, Richard I., "Self–Calibration from Multiple Views with a Rotating Camera", *Lecture Notes in Computer Science*, vol. 800, pp.471–478, 1994.

Sun, Huifang and Kwok, Wilson, "Concealment of Damaged Block Transform Coded Images Using Projections onto Convex Sets", *IEEE Transactions on Image Processing*, vol 4, No. 4, Apr. 1995, pp. 470–477.

METHOD AND APPARATUS FOR PERFORMING MOSAIC BASED IMAGE COMPRESSION

CROSS REFERENCE TO RELATED APPLICATION

This application is a divisional application of patent application Ser. No. 08/339,491, filed on Nov. 14, 1994 and entitled: "MOSAIC BASED IMAGE PROCESSING SYSTEM", now U.S. Pat. No. 5,649,032.

BACKGROUND OF THE DISCLOSURE

1. Field of the Invention

The invention relates systems that process images and, more particularly, to systems that automatically generate a mosaic of individual images and process the mosaic.

2. Description of the Prior Art

Until recently, image processing systems have generally processed images, such as frames of video, still photographs, and the like, in an individual manner. Each individual frame or photograph is typically processed by filtering, warping, and applying various parametric transformations. After processing, the individual images are combined to form a mosaic, i.e., an image that contains a plurality of individual images. Additional image processing is performed on the mosaic to ensure that the seams between the images are invisible such that the mosaic looks like a single large image. The alignment of the images and the additional processing to remove seams is typically accomplished manually by a technician using a computer workstation, i.e., the image alignment and combination processes are computer aided. In such computer aided image processing systems, the technician manually selects processed images, manually aligns those images, and a computer applies various image combining processes to the images to remove any seams or gaps between the images. Manipulation of the images is typically accomplished using various computer input devices such as a mouse, trackball, keyboard and the like. Unfortunately, such manual mosaic construction is time consuming and costly. Furthermore, manual mosaic construction cannot be accomplished in real-time, i.e., the mosaic cannot be constructed as the images are generated by an image source such as a video camera. Consequently, the images in a real-time image generation system are stored for subsequent computer aided processing at a later time.

Since manually generated mosaics are costly, such mosaics do not find much practical use except in publishing applications and image retouching systems. Although mosaics hold much promise, the lack of an automatic mosaic construction system has limited their use.

Therefore, a need exists in the art for a system that automatically generates a mosaic from either pre-existing images or in real-time as the images are generated by an image source. Furthermore, a need exists for systems that utilize the automatically generated mosaic in various practical applications.

SUMMARY OF THE INVENTION

The present invention overcomes the disadvantages heretofore associated with the prior art by automatically generating a mosaic from a plurality of input images. Specifically, the invention is a mosaic construction system that sequentially executes an image alignment process and a mosaic composition process such that, from a sequence of images, the system automatically produces a mosaic for utilization by various applications. The invention is capable of constructing both dynamic and static mosaics. A dynamic mosaic includes imagery that is time variant, e.g., the mosaic is updated with new content over time, while the content of a static mosaic is time invariant.

More specifically, the image alignment process automatically aligns one input image to another input image, an input image to an existing mosaic (generated from previously occurring input images) such that the input image can be added to the mosaic, or an existing mosaic to an input image. In each of these instances, the coordinate system within with the aligned images is either the coordinate system of the input image, the coordinate system of the mosaic or an arbitrary reference coordinate system. The arbitrary reference coordinate system can be either time invariant or time variant.

Furthermore, the input image and mosaic can be aligned to one another within an image pyramid framework. As such, the system converts both the input image and the mosaic into Laplacian image pyramids and the alignment process is applied to the levels within the respective pyramids. Consequently, the system uses an accurate coarse-to-fine image alignment approach that results in sub-pixel alignment accuracy. The outcome of the alignment process is alignment information that defines the transformations required to achieve alignment, a dynamic mosaic, between the input image and the mosaic such that the mosaic can be updated with the image information contained in the input image and, in a static mosaic, between the images comprising the mosaic.

Once the alignment process is complete, the invention utilizes a mosaic composition process to construct (or update) a mosaic. The mosaic composition process contains two processes: a selection process and a combination process. The selection process automatically selects images for incorporation into the mosaic and may include masking and cropping functions. Once the selection process selects which image(s), or portions thereof, are to be included in the mosaic, the combination process combines the various images to form the mosaic. The combination process applies various image processing techniques, such as merging, fusing, filtering, image enhancement, and the like, to achieve a seamless combination of the images. The resulting mosaic is a smooth image that combines the constituent images such that temporal and spatial information redundancy are minimized in the mosaic.

The automatically generated mosaic finds many practical uses. Illustrative uses include: (1) a mosaic based display system including an image printing system, (2) a surveillance system and (3) a mosaic based compression system. The mosaic based display system permits a system user to display, manipulate, search and alter a mosaic. The mosaic based compression system exploits the temporal and spatial redundancy in image sequences and efficiently compresses the image information. The compression system can be used for compressing image information for storage in a storage device or can be used for compressing image information for transmission through a band-limited transmission channel. The surveillance system combines the mosaic construction system, the compression system and the display system to provide a comprehensive system for remote motion detection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Generally, a mosaic is a data structure that melds visual information from a set of images taken at a plurality of time instants, viewpoints, or fields of view. The various images are aligned and combined to form, for example, a panoramic view of a scene as a single still image. Importantly, a mosaic is not limited to a combination of distinct images, but may also be a combination of mosaics. The invention is a system that automatically forms a mosaic from a plurality of images for utilization by various application systems. The invention includes one or more of these application systems.

There are two types of mosaics: dynamic mosaics and static mosaics. Dynamic mosaics are time variant in that they are recursively updated over time with new imagery. As such, a series of input images (e.g., video frames) are combined one at a time with the other images in the series to produce the dynamic mosaic. Thereafter, the system aligns and combines each new input image with the previous mosaic, i.e., the mosaic is updated.

In a static mosaic, the content of the mosaic is time invariant. For example, a series of existing input images are divided into subsequences of images. The individual images in each subsequence are aligned with one another and combined into a static mosaic. The static mosaic is not updated with new information, i.e., the content of the mosaic is static.

In each of these two types of mosaics, the mosaics are constructed with reference to an arbitrary reference coordinate system which can be either time variant or time invariant. In other words, the coordinate system can be either altered while the mosaic is constructed or it can be fixed over time. The arbitrary reference coordinate system can be selected as the coordinate system of the latest input image of a dynamic mosaic, the coordinate system of the mosaic in a dynamic mosaic, the coordinate system of one of the images in a static mosaic, an arbitrary fixed coordinate system that is not related to the images or the mosaics, or it can be an arbitrary time variant coordinate system. Throughout the remainder of this discussion, the general term reference coordinate system is used, this general term is intended to encompass any form of reference coordinate system.

Figure 1:
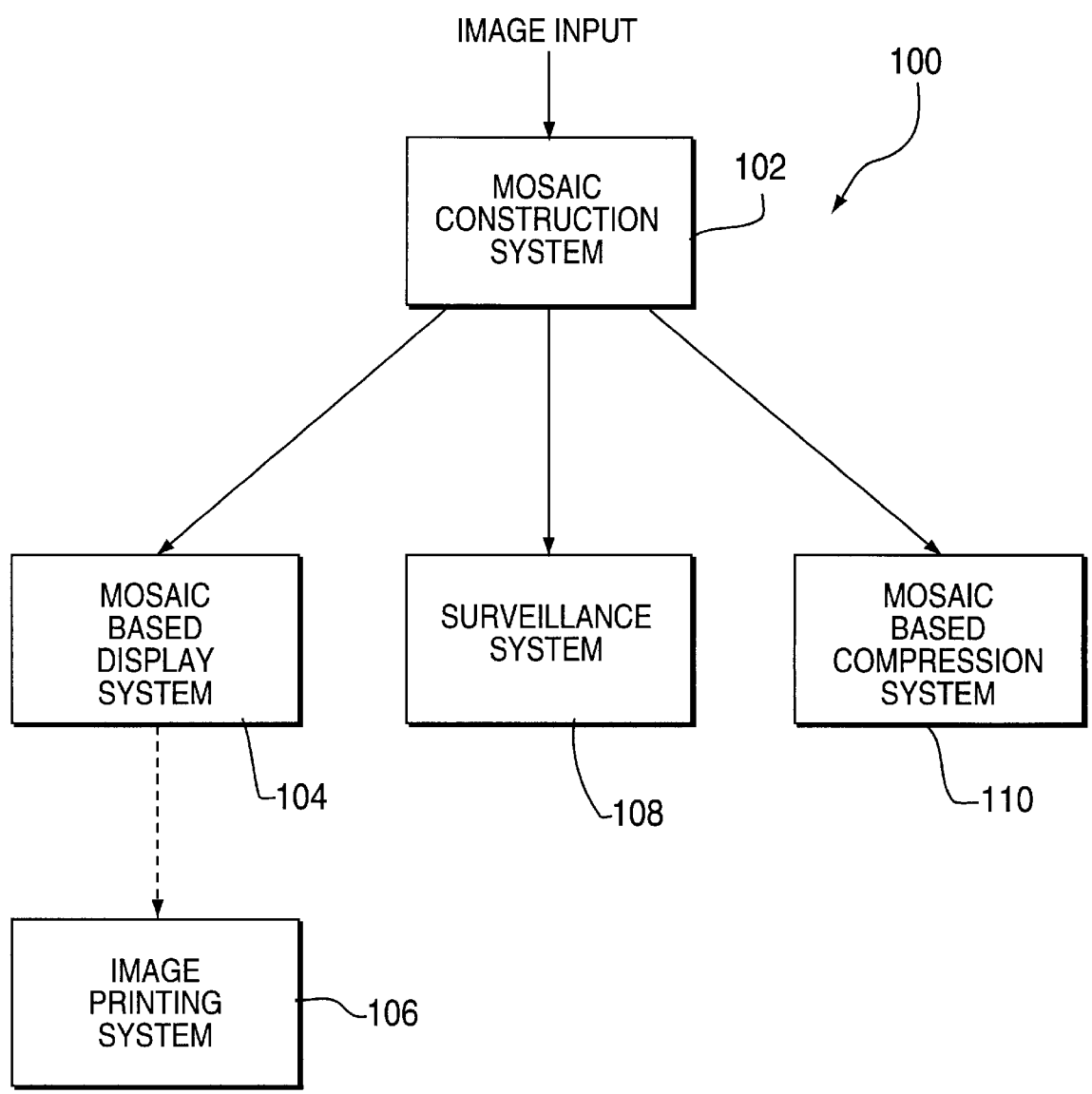
FIG. 1 shows a block diagram of a system for automatically constructing a mosaic and various systems for utilizing the mosaic in image compression, surveillance, and image display.

FIG. 1 depicts a block diagram of a mosaic based image processing system 100 that contains a mosaic construction system 102 as well as one or more application systems 104, 106, 108, 110 for a mosaic. Specifically, the application systems include a mosaic based display system 104 which may include a mosaic based printing system 106, a mosaic based surveillance system 108, and a mosaic based compression system 110. The following disclosure first provides an overview of the mosaic construction system and its interaction with the application systems. Thereafter, the disclosure describes, in a series of distinct subsections, the details of the mosaic construction system for constructing both static and dynamic mosaics and each application system.

The mosaic construction system 102 has as an input a series of images. These images can be a video frame sequence, a series of satellite infra-red or visible photographs, a sequence of aerial photographs, or any other series of images that, when aligned with one another, form a mosaic. The images may be provided in real-time, i.e., the images may be provided directly from, for example, a video camera. In operation, the mosaic construction system 102 automatically aligns the input images and combines them to form a mosaic.

Figure 2A:
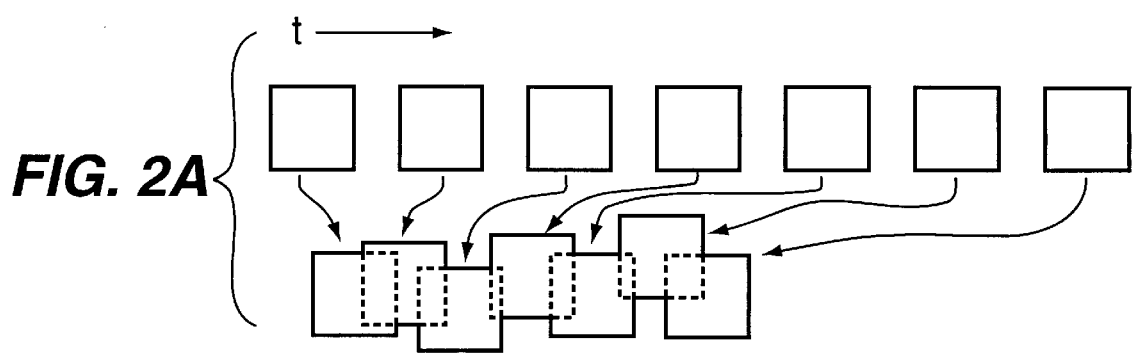
FIGS. 2A, 2B and 2C respectively depict a schematic rendering of batch mosaic construction sequencing, recursive mosaic construction sequencing and hierarchical mosaic construction sequencing.
Figure 2B:
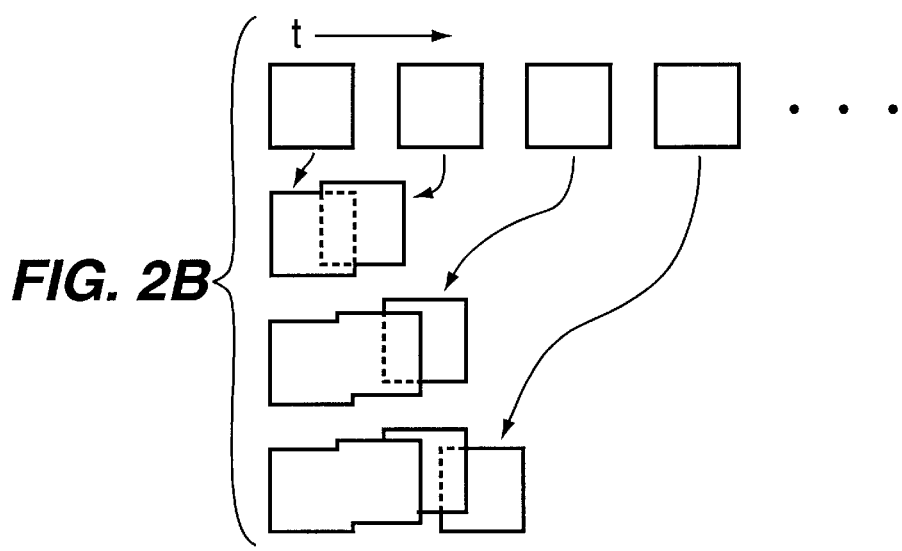
Figure 2C:
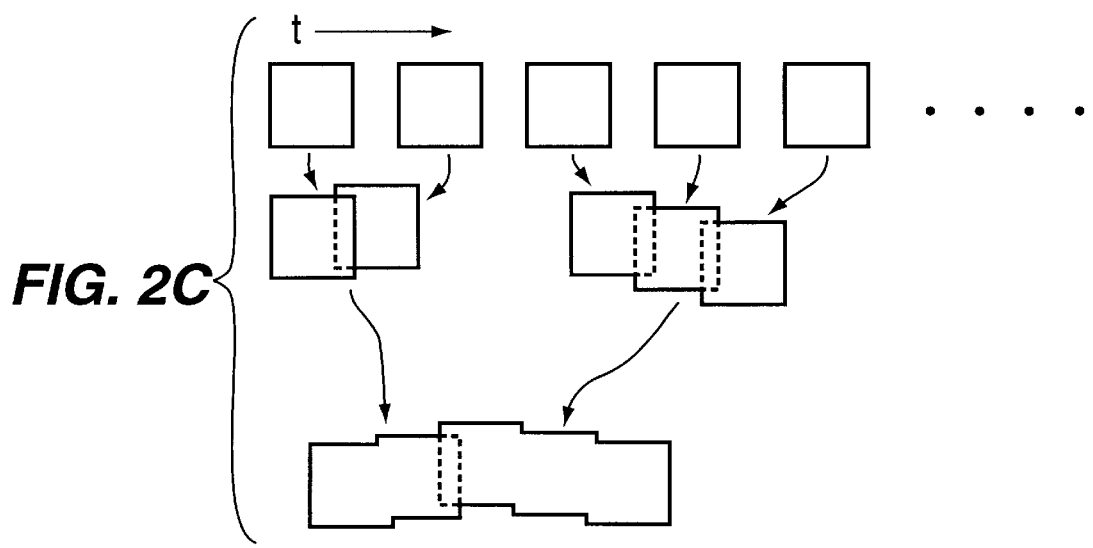

More specifically, depending upon the application for the mosaic, the system can construct either a dynamic mosaic or a static mosaic. In addition, the system can utilize any reference coordinate system while constructing a mosaic. Furthermore, in composing the mosaic from the aligned images, the system may use any one of a number of image fusing, merging, filtering, and averaging processes to best produce a seamless mosaic. Also, as shown in FIG. 2, the system forms the mosaic using various input image and mosaic construction sequencing processes including batch (FIG. 2A), recursive (FIG. 2B), and hierarchical (FIG. 2C) sequencing.

Returning to FIG. 1, the mosaic is used by one or more of the application systems. For example, the mosaic based display system 104 utilizes special mosaic storage and manipulation techniques that enable a system user to rapidly have a mosaic displayed upon a computer monitor and enable the user to manipulate the displayed mosaic. The mosaic based display removes the image source (e.g., camera) motion from the mosaic image, i.e., the image is stabilized. A user may select to leave some camera movement in the displayed image to provide a sense of the camera's movement, but entirely remove high frequency jitter. Such a display is especially useful when displaying aerial photographs taken from, for example, a helicopter. The moving display provides the user with a sense of motion over the depicted terrain without any camera jitter.

Furthermore, to provide additional information to a user, this display system merges other data into the mosaic display. This other data may be numerical or graphical terrain elevation information, motion vectors, graphical indicators showing the most recent image, and the like. The details of this system are described below with respect to FIG. 7.

In addition to displaying the mosaic, or portions thereof on a computer monitor, this mosaic based display system may optionally be used in conjunction with an image printing system 106. The printing system is capable of generating high-resolution color or monochrome still images of the mosaic or any portion thereof.

The surveillance system 108 uses a mosaic for detection of motion, for example, for security purposes or for motion detection on a battlefield. Generally, a panoramic view of an area of interest is captured by, for example, a high-resolution video camera. The mosaic construction system 102 generates a single high-resolution mosaic of the entire panoramic view. This mosaic is used as a reference view. Subsequent frames captured by the video camera are compared to the reference view. Any movement in the reference is detected as residuals from comparing the new image to the reference mosaic. The details of the surveillance system are provided with respect to FIGS. 12 and 13.

The mosaic based compression system 110 uses the mosaic as a basis for efficiently compressing image information for transmission through a low bandwidth transmission channel. An alternative of the compression system is used to compress image information for efficient storage within a storage medium such as a disk drive or compact disk. To achieve efficient compression, the compression system exploits the large spatial and temporal correlation's that exist in sequences of images. The details of the mosaic based compression system are provided below in connection with FIGS. 8, 9, 10, and 11.

Next, the mosaic construction system is described in detail. This description is followed by a detailed description of each of the illustrative applications for a mosaic constructed by the mosaic construction system.

I. MOSAIC CONSTRUCTION SYSTEM 102

To best understand the differences between construction of a dynamic mosaic and construction of a static mosaic, each construction process is described separately. First the dynamic mosaic construction process is described (FIGS. 3, 4, 5, and 6) and then a static mosaic construction process (FIG. 14) is described.

A. Dynamic Mosaic Construction 301

Figure 3:
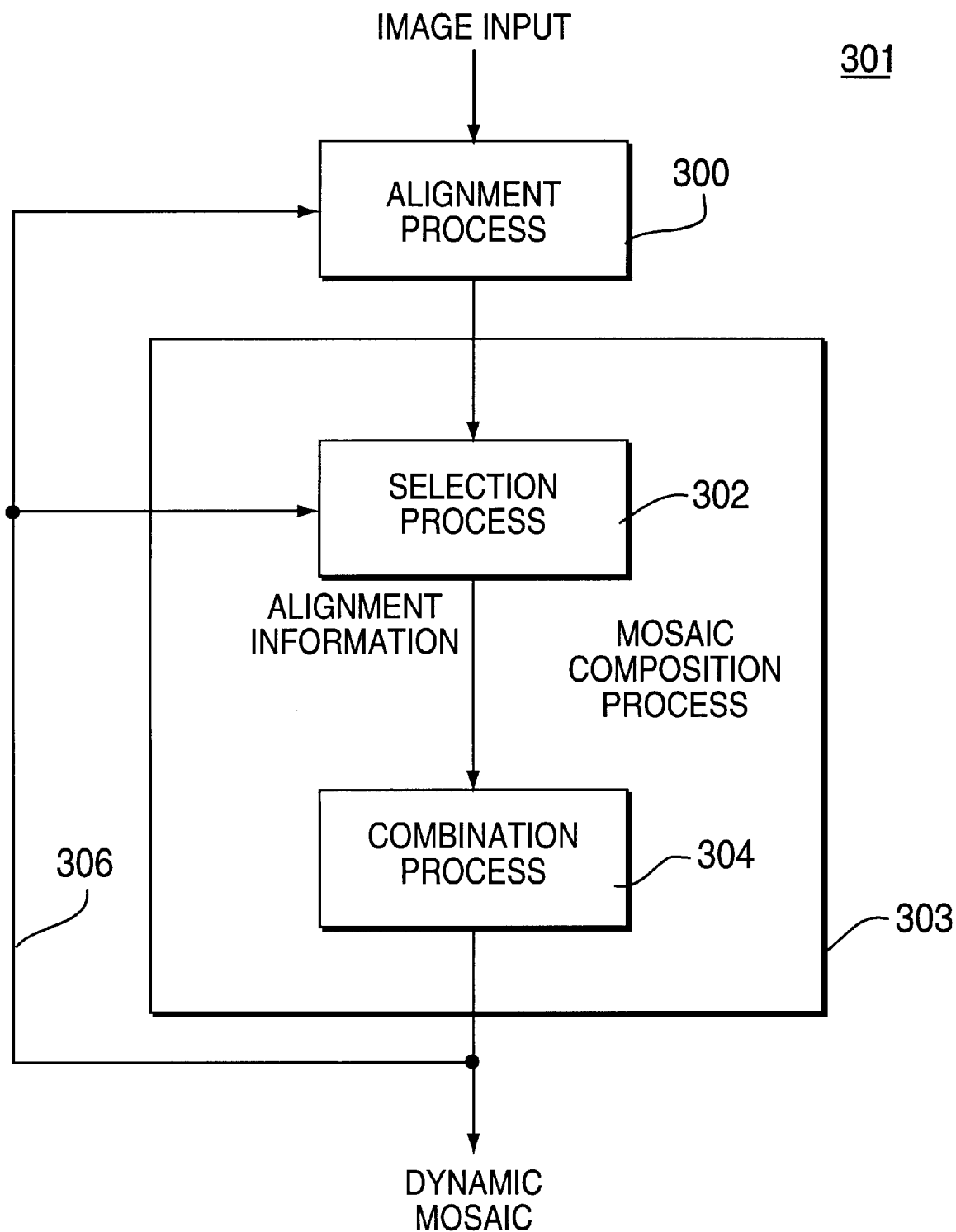
FIG. 3 depicts a detailed block diagram of a dynamic mosaic construction system.

FIG. 3 depicts a flow chart of the operation of a dynamic mosaic construction system 301. The system contains two sequentially executed processes; namely, an image alignment process 300 and a mosaic composition process 303. The mosaic composition process 303 further contains two processes; namely, a selection process 302 and a combination process 304. The alignment process 300 aligns the input image with a previously constructed mosaic (if any), supplied via line 306. If a mosaic does not currently exist, i.e., the input image is the first image of a sequence of images, then the first image is used as a previously constructed mosaic. In effect, the first image becomes the mosaic for the second image. In generating a dynamic mosaic, typically, the system uses recursive mosaic construction sequencing. Thus, the next image in the sequence is aligned with the current mosaic (a mosaic constructed of preceding images in a series of images). Alignment is accomplished by aligning the input image with the mosaic, i.e., the mosaic and input images are aligned with the reference coordinate system. The aligning process is accomplished by warping the images to one another. The image alignment process generates, for each image, the necessary alignment information to align the input image such that its image information can be combined with the existing mosaic. The alignment information defines the affine transformation required to align, for example, a given input image with the reference coordinate system.

If hierarchical mosaic construction sequencing is used, or if sub-mosaics are desired, the image alignment process generates alignment information for each of the sub-mosaics as well as for each of the constituent images of these submosaics.

Within the mosaic composition process 303, the selection process 302 selects which portions of the input image and current mosaic will be used to form an updated mosaic. The updated mosaic is a mosaic including at least a portion of the latest input image and at least a portion of the previous mosaic. The selection process may perform masking or cropping to limit the size of the mosaic. It may also perform image selection in which untimely ("old") images are removed from the mosaic.

The combination process 304 combines the aligned images to form an updated mosaic. The combination process performs one or more of the following processes to seamlessly combine the input image with the mosaic: merging, fusion, interpolation, extrapolation, enhancement, coring, as well as other conventional image combining processes. The output is an updated dynamic mosaic containing seamlessly combined image information from the latest input image.

To perform the alignment and ultimately combine the input image with the mosaic, the resolution of the input image can be transformed to the resolution of the mosaic or vice versa. However, it is best to generate a conventional Laplacian image pyramid of the input image and also of the entire mosaic, i.e., the system 102 becomes multi-resolutional. As such, alignment is performed on a course-to-fine basis such that an initial alignment is performed using a relatively low resolution level in each of the pyramids and then sequentially higher resolution pyramid levels are used to perfect the alignment. Such a pyramid framework improves the speed at which an alignment can be accomplished as well as the accuracy of the alignment. Throughout the remainder of the discussion of the mosaic construction system and its applications, it is assumed that the input image and the mosaic are pyramids. However, those skilled in the art should realize that the pyramid framework is not necessary to practice the invention and that simple resolution transformation could be used instead of a pyramid framework.

Furthermore, since the reference coordinates to which the latest image, the mosaic, or both are warped to can be arbitrarily selected, the display system is flexible. For example, in an airline display application, the system displays, at a central location on a cathode ray tube (CRT), the latest image captured by a nose mounted video camera. The remainder of the mosaic trails from that central area to the bounds of the display area. As such, the pilot can view what is in front of the aircraft, e.g., an approaching airport, as well as what had just previously passed through camera's field of view. Thus, the pilot can see a historical record of the aircraft's approach to the airport. The importance of the ability to freely select a reference coordinate system shall become more apparent when the various applications for the mosaic are described.

Figure 4:
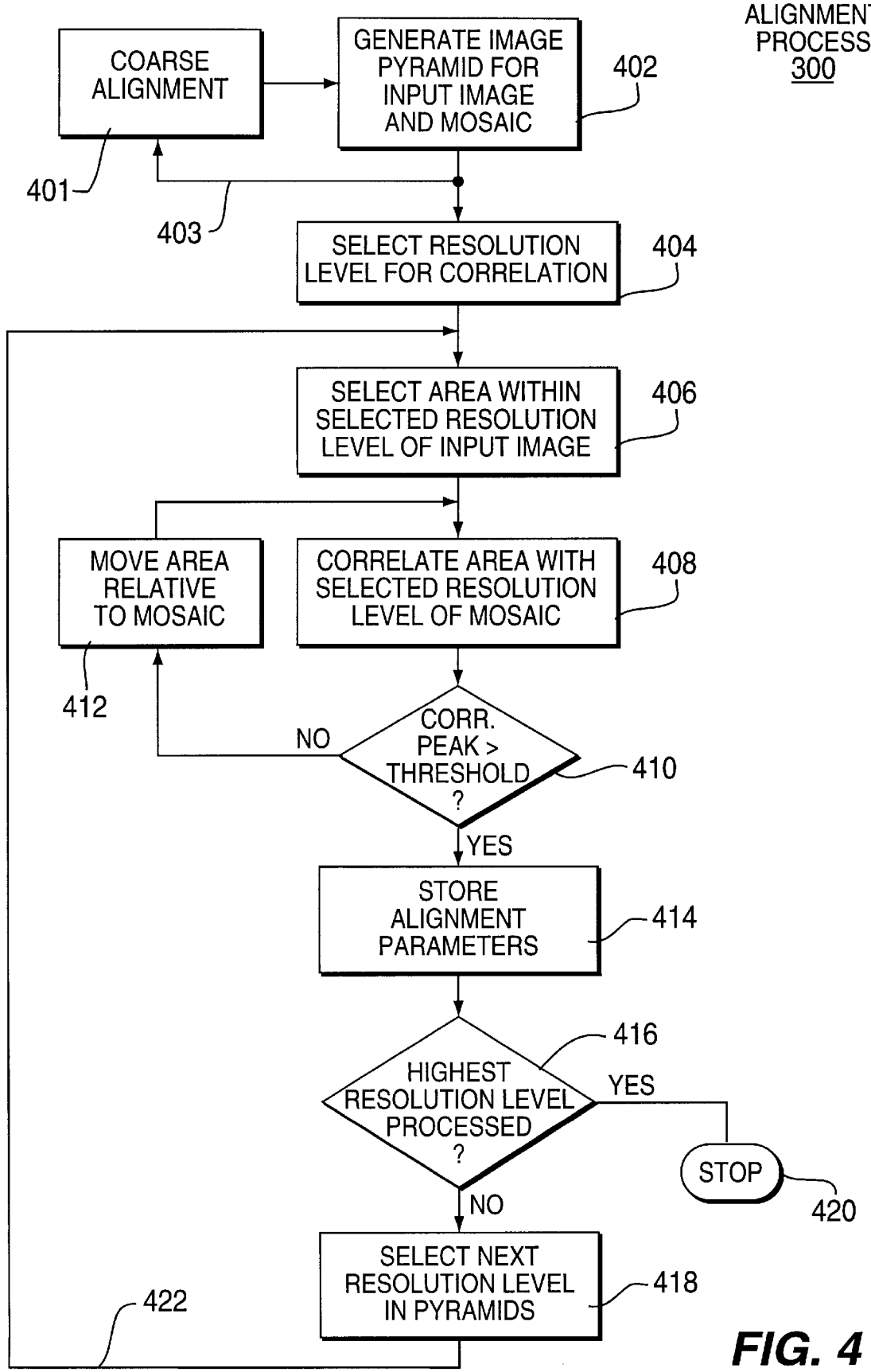
FIG. 4 depicts a flow chart of an image alignment process that aligns an input image to a mosaic of images.

FIG. 4 depicts a detailed flow chart of the alignment process 300. Generally speaking, prior art systems have accomplished image alignment to align two sequential video frames by correlating the image information contained in each frame. Such a video frame alignment system is disclosed in a U.S. patent application entitled "SYSTEM AND METHOD FOR ELECTRONIC IMAGE STABILIZATION", attorney docket number 11258, filed Oct. 28, 1994, accorded Ser. No. 08/328,783, and herein incorporated by reference. The present invention uses an alignment system very similar to the alignment system disclosed in this patent application, except that the alignment system for the present invention aligns an input image to an entire mosaic rather than to a single previous input image. Nonetheless the alignment concepts are similar.

Specifically, the alignment process first conducts a coarse alignment to generally align the latest image with the existing mosaic. Thereafter, a coarse-to-fine alignment process aligns the lowest resolution level of the pyramid for the input image with respect to a comparable resolution level of the pyramid for the current mosaic (assuming a recursive mosaic construction sequencing and the mosaic coordinate system forms the reference coordinate system). To achieve alignment of comparable resolutions, the lowest level of one pyramid may be aligned with higher level of the other pyramid.

To begin alignment, step 401, coarsely aligns the input image and the mosaic. The coarse alignment is accomplished using information from image pyramids of the input image and the mosaic. Therefore, at step 402, the process generates an image pyramid for both the input image and the mosaic. Information from the pyramids are carried along line 403 to the coarse alignment step. Typically, the system accomplishes this coarse alignment by merely using the position of the previous input image in the mosaic as the initial alignment position for the present input image. If the image sequence is a video frame sequence, then this form of coarse alignment functions rather well. However, there are instances where the present input image may contain none, or very little, of the imagery of the previous image, but may contain imagery of some other portion of the mosaic. In that instance, using the previous image location for coarse alignment would not function well.

Thus, to improve coarse alignment, the mosaic is "tiled". As such, the mosaic is subdivided into smaller mosaics, called tiles, which are linked together through coordinate transformations. This tiled mosaic has the advantage that a single coordinate system is not utilized throughout the entire mosaic (a collection of all the tiles taken together) and, consequently, accumulated alignment error is small within a given tile.

Illustratively, each tile is four times the size of any one input image. Of course, other size tiles may be used. The input image is coarsely aligned with the tile in which the previous image in the sequence was placed. Within the present input image, a number of subwindows, e.g., three regions having a 16 by 16 pixel dimensions, are selected as "landmarks". These landmarks are computed at a selected pyramid level, e.g., level 3. The landmarks are selected as the three areas in the input image, at the selected pyramid level, having the largest image energy as compared to all other areas in the image.

With each possible shift of the input image with respect to the tile containing the previous input image, the landmarks are individually correlated against correspondingly sized areas in the tile. The correlation values are integrated into a single measure; namely, a correlation surface. The peak value of the correlation surface provides the approximate position of alignment for the input image and the tile. From this approximate position (coarsely aligned position), precise alignment is begun.

At step 404, the lowest resolution level is selected in both image pyramids to begin the correlation process. In theory, the lowest levels would be used from both pyramids. However, the input image and the mosaic could have substantially different resolutions, i.e., the mosaic could depict a "long shot" of a scene, while the input image could contains a small portion of the mosaic (zoomed in view). Thus, the lowest resolution level for the mosaic could correspond to a middle resolution level in the input image, or vice versa. As such, to best align the image and the mosaic, the selected pyramid levels may be different, e.g., not merely the lowest resolution levels. Typically, the best estimate of the pyramid level to use is contained in the alignment parameters used to align the previous image to the mosaic.

At step 406, an area (e.g., 3 by 3 pixels) is selected from the selected resolution level of the pyramid for the input image. This area is correlated at step 408, with the selected resolution level for the mosaic. At step 410, the process queries whether the correlation peak in a correlation surface is greater than a predetermined maximum correlation peak for this resolution level (a threshold value). If the query is answered negatively, the selected area is moved, at step 412, relative to the mosaic coordinate system and correlated again at step 408. The method repeats steps 410, 412, and 408 until the query at step 410 is affirmatively answered. Thereafter, the process stores, at step 414, the alignment parameters that align, at this resolution level, the input image to the mosaic.

More specifically, let $L_C$ denote the spatial resolution with $L_C=0$ being the highest resolution and $L_{L_C}$ denote the Laplacian image at resolution $L_C$. After coarse alignment of an input image $L_{L_C}[t-1]$ has been warped into approximate alignment with the mosaic. As such, the image and the mosaic are shifted with respect to one another and imagewise multiplied, yielding a product image. For a shift of (i,j), the product image $I_{i,j}$ is defined as:

$$I_{i,j}=L_{L_C}[t](x,y)L_{L_C}[t-1](x+i,y+j) \qquad (1)$$

with $i,j\in[-N,N]$. Integrating the image $I_{i,j}$ fully yields the cross-correlation value $C_{i,j}$ between the two full Laplacian images (input image and mosaic) at shift (i,j). Local cross-correlation values are computed by integrating each product image $I_{i,j}$ over local areas (patches of image) to yield cross-correlation "images" of the form $C_{i,j}(x,y)$. However, to avoid border effects and make the results most representative of the information at the centers of the local patches, a weighted function W(x,y) is preferred over simple neighborhood averaging for local intergration. Therefore, the values for $C_{i,j}(x,y)$ are computed from the image $I_{i,j}$ with:

$$C_{i,j}(x,y)=I_{i,j}(x,y)W(x,y) \qquad (2)$$

where W(x,y) is the intergration weighting function and denotes convolution.

The convolution with kernel W(x,y) (typically a Gaussian function) has the effect of smooothing the product images $I_{i,j}$ into the cross-correlation images $C_{i,j}$. Depending upon the size of the kernel, the resulting $C_{i,j}$ is oversampled to various degrees. Therefore, estimating an image flow field (i.e., the pixel-by-pixel movement of one image necessary to achieve alignment with another image) based on an analysis of $C_{i,j}(x,y)$ directly results in a correspondingly oversampled flow field. In order to keep computational costs of the product computation to a minimum, a pyramid reduction process for the integration is used instead of performing convolutions of the product images at the correlation resolution level $L_C$. Different numbers of pyramid reduction steps can be used to achieve integration over correspondingly different spatial areas, with each pyramid level generated at an integration step reducing the size of the flow field (and the computational costs associated with this flow field) by a factor of four.

The critical parameters for the local cross-correlation process are: (1) the spatial resolution level $L_C$ used for the Laplacian images (input image and mosaic), (2) a half-width N of the correlation search, and (3) a spatial resolution $L_i$ chosen for integration, where $L_i=L_C$+the number of integration steps used.

The value of $L_C$ determines a spatial frequency band used for the motion estimation (estimated translation parameters or vectors to align the image and the mosaic), and hence the motion that will be detected during iteration. A single pixel shift at level $L_C$ corresponds to a shift of $2^{L-c}$ at the highest resolution level. This shift dictates the overall range and precision of the estimates yielded from analyzing at this resolution level.

The size of the correlation search area N determines the maximum displacement (range) that can be estimated at spatial resolution $L_C$. Although larger values of N allow for a larger range of motions to be estimated, the potential for false matches also increase. Also, there is a quadratic increase in the attendant computational costs, Therefore, in practice, the values for N are restricted to 1 or 2.

The level of integration, $L_i$, determines two things. First, it determines the amount of smoothing that has been performed on the correlation results. Larger smoothing leads to better signal-to-noise characteristics, but will correspondingly result in poorer estimates of the spatial location of the correlation peak. More significantly, it makes the implicit assumption that the correlation values (and the flow field) within the area of integration are locally smooth, which may not be the case everywhere in the image. Also, $L_i$ determines the size of the resulting flow field, since a flow estimate can be made for each position in the integrated correlation image excluding the borders. Therefore, the integration level $L_i$ is chosen just large enough to provide the necessary support for reliable and accurate flow estimates.

Since the Laplacian is a signed image with approximately zero local mean values, the correlation surface has the both positive and negative values. This is similar to using a type of mean normalized correlation on Gaussian blurred images. Note also that the magnitudes of the correlation values are not normalized. While such normalization is completely within the scope of the process, in practice, this increases the burden on the computation and the resulting increase in the accuracy of the flow field is small. Considering this, correlation normalization was not included in the present process.

To obtain a sub-pixel accuracy (a subpixel flow estimate) to the alignment, a relatively small area (N=1 is a 3 by 3 pixel area) is used and interpolated to find a peak in the correlation surface within the area. Assuming that a peak occurs within ½ pixel of the center of the correlation surface, the horizontal and vertical locations of the peak are estimated separately. Thus, in each direction the following one-dimensional equation is solved:

$$S_{max} = \frac{P_3 - P_1}{2(P_2 - \text{MIN}(P_3, P_1))} \quad (3)$$

where $P_1$, $P_2$ and $P_3$ are three correlation values in the correlation surface. If the assumption that the correlation peak is within ½ a pixel from the center of the surface, then another process must be used to determine the subpixel correlation peak. A discrete second derivative is computed about the center of the correlation surface to determine if the correlation data is suitable for interpolation using Equation (3). Peaks at a shift of greater than a full pixel result in no maximum being detected at the center of the surface. Shifts of greater than ½ a pixel but less than 1 pixel pass the second derivative test and can be interpolated, but the shift estimates in this case are not as accurate as the measurements for pixels at less than ½ a pixel shift.

Using the $P_1$, $P_2$ and $P_3$ nomenclature as before, a test using the second derivative about the center of the surface along one of the lines through the surface is given by $T=2-P_2-P_3-P_1$. If T<0, then there is no maximum detected around that position in the correlation surface and no vector should be estimated for that point in the image. Likewise, the diagonally-oriented lines on the 3 by 3 surface passing though the center should be checked using the same test: if one of the diagonal orientations does not show a peak about the center, then no vector should be estimated for that location.

Lastly, the alignment process fits the flow field to a linear, first order motion model. A least-squares regression is used to fit the vectors in the flow field to these models. Vector confidence values are used to weigh each vectors influence to the regressions—when vectors have 0 valued confidence, these vectors do not contribute to the regression at all, while positive valued confidences allow the vectors to contribute to the regression in a weighted manner.

The image alignment process iterates the foregoing process using steps 408, 410, 412 until the desired sub-pixel accuracy is obtained. In step 414, the process stores the alignment parameters that can be used to transform the image such that it is aligned with the mosaic.

The process queries, at step 416, whether the highest resolution level in one of the pyramids has been processed. If this query is answered negatively, the process selects, at step 418, the next higher resolution level in each of the pyramids. Thereafter, the process returns along line 422 to step 406. Thereafter, the process repeats steps 406, 408, 410, 412, 414, 416 and 418, until an area in each of the resolution levels has been processed and the query at step 416 is affirmatively answered. At that point, the process stops at step 420. Upon stopping, the process has aligned the input image to the mosaic using a coarse-to-fine alignment process. The alignment parameters, e.g., a set of values that can be used to transform the present input image to an aligned location in the mosaic, are stored in memory.

The foregoing is only one illustrative example of a process for precisely aligning the image and mosaic. Other processes are just as useful as that described above. Other illustrative precision alignment processes are described in Bergen et al., "Hierarchical Model-based Motion Estimation", Proceedings of European Conference on Computer Vision-92, pp. 1–21, 1992, which is incorporated herein by reference.

Figure 5:
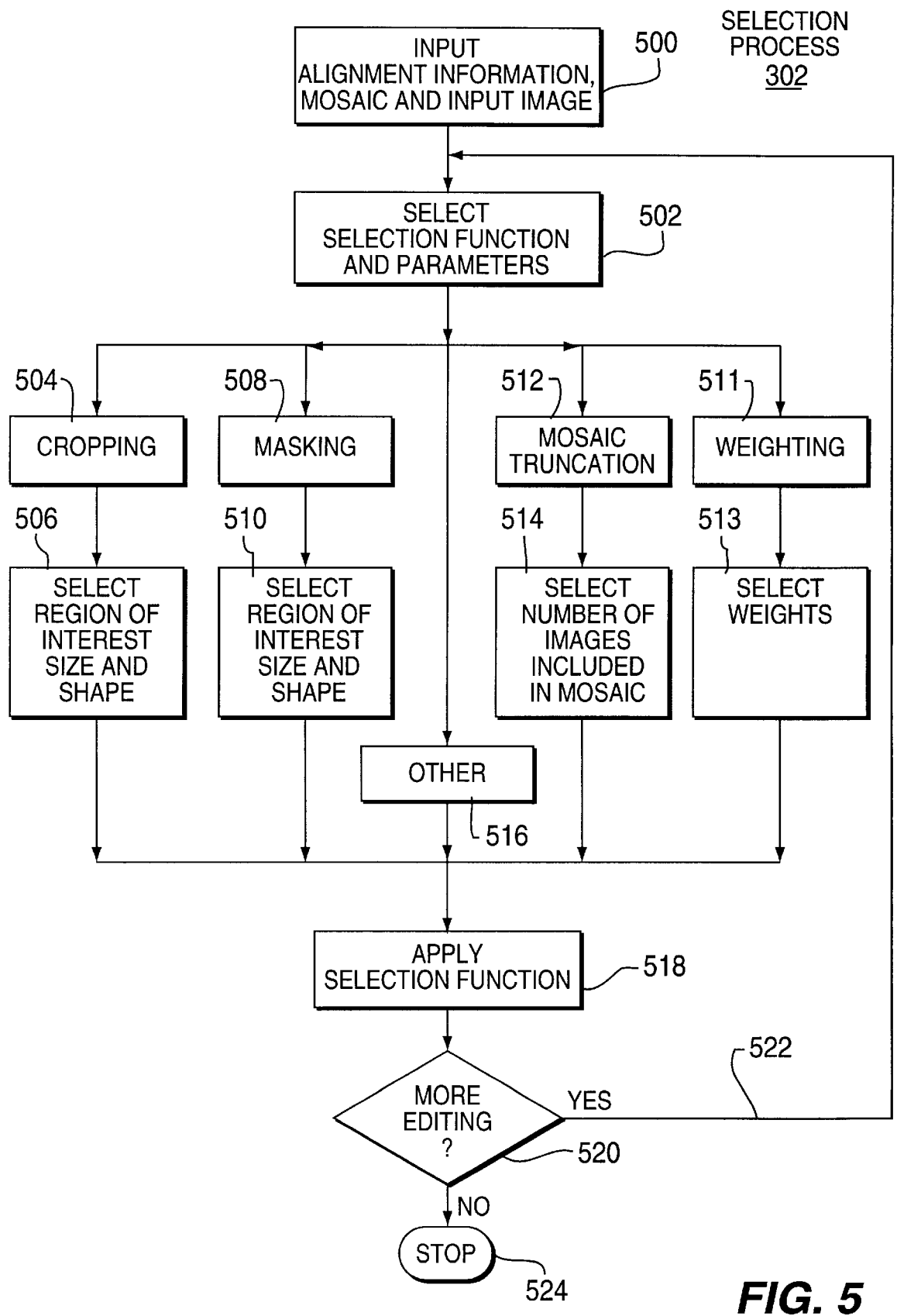
FIG. 5 depicts a flow chart of a selection process that selects the image(s), or portions thereof, for inclusion in the mosaic.

FIG. 5 depicts a flow chart of the selection process 302 for selecting the mosaic and/or the input image, or portions thereof, to fulfill certain mosaic content criteria. These selection functions may include cropping, masking, eliminating "old" images from the mosaic, image weighting, and the like. The selection functions may be either user selectable or automatically predetermined to best accomplish specific mosaic requirements. The following discussion assumes the selection functions are user defined.

Specifically, process 302 begins, at step 500, with the input of the alignment information, the existing mosaic and the input image. At step 502, the user selects a selection function and associated control parameters for the selected function. Typically, such selection would be from a menu of functions and parameters. To illustrate some possible selection functions, the process is depicted as branching from step 502 to steps 504, 508, 512, and 516. The specific branch used depends upon the selected selection function.

For example, if a user selects a cropping function, the process proceeds to step 504. At step 506, the user defines certain parameters to control the cropping function, e.g., select a region of interest in an image or mosaic. Alternatively, the user could select masking (step 508) or mosaic truncation (step 512) as editing functions. In each case, at steps 510 and 514, certain parameters are then defined to control each editing function. Furthermore, a weighting function (steps 511 and 513) can be assigned to selected images, or parts thereof, such that salient features of the images are removed, e.g., weighting can be accomplished to remove moving objects and retain only a background scene as the mosaic. On the other hand, the salient features can be weighted to permit the moving objects to stand out from the background. Step 516 is labeled "OTHER" to indicate that other editing functions can be performed and that those depicted are only to be considered to be illustrative.

At step 518, the editing functions are applied to the input image and mosaic in accordance with the associated control parameters. The process queries, at step 520, whether the user desires to apply further editing functions. If the query is answered affirmatively, the process proceeds along line 522 to step 502. If the query is answered negatively, the process stops at step 524.

Figure 6:
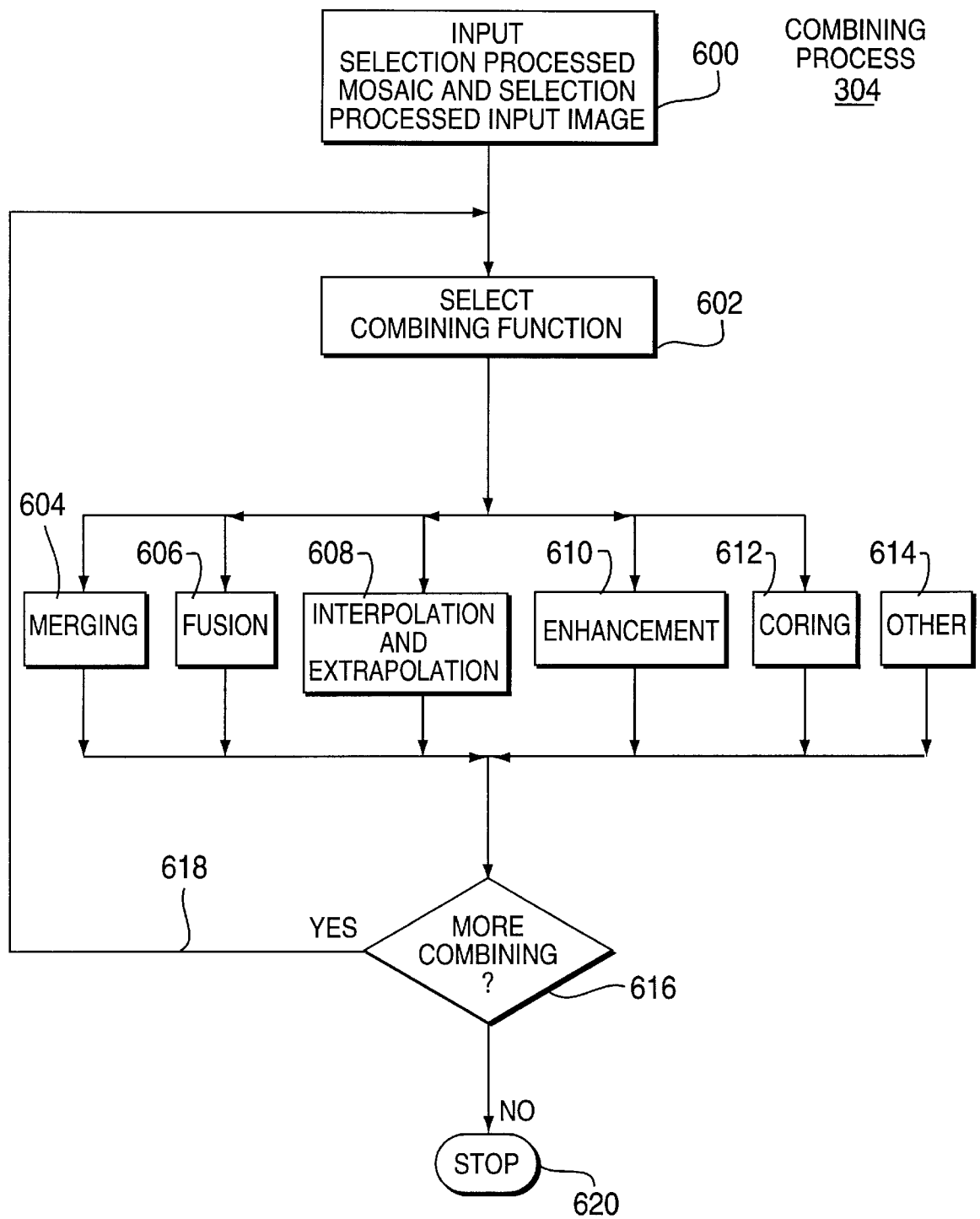
FIG. 6 depicts a flow chart of a combination process that combines the aligned image with the mosaic.

FIG. 6 depicts the combination process 304 which combines the input image and the mosaic. The process begins at step 600 by inputting, after selection processing, the mosaic and the input image. To achieve a seamless combination of the input image and the mosaic, one or more different combining functions may be applied to the input image and mosaic. Thus, at step 602, a combining function is selected either by user or automatically. This may be user selected, but more typically, the functions to be used are defined by the application of the system and are automatically applied to the mosaic and input image. In any event, steps 604, 606, 608, 610, and 612 are illustrative examples of processes that have conventionally been used to seamlessly combine images. For example, the process, at step 604, applies an image merging technique to the mosaic and input image. Such a merging technique is disclosed in U.S. patent application Ser. No. 08/942,877, filed Sep. 10, 1992, which is incorporated herein by reference. This application is commonly assigned to the assignee hereof.

Similarly, the process, at step 606, uses an image fusion technique to combine the mosaic and the input image. Such a fusion technique is disclosed in U.S. Pat. No. 5,325,449, issued Jun. 28, 1994, which is incorporated herein by reference. This patent is commonly assigned to the assignee hereof.

The interpolation and extrapolation process, at step 608, is used in a conventional manner to fill gaps between images comprising the mosaic. The enhancement process, at step 610, is used to adjust (amplify or attenuate) the relative contributions of selected levels in the pyramids representing the mosaic. Enhancement can be applied over an entire level, or it can be applied only over a portion of a level may be enhanced relative to the remaining pixels in that level. The coring process, at step 612, is threshold each pixel at a threshold level such that pixels having values less than the threshold are eliminated from the updated mosaic.

Lastly, step 614, is a step labeled "OTHER" to indicate that the foregoing steps are intended to be illustrative combining functions. Depending upon the nature of the images and the application in which they are used, other functions may be used to better combine the input image and the mosaic. Other functions include, but are not limited to, temporal averaging, median filtering, superresolution processing, and weighted averaging. Those skilled in the art should understand that other combining functions are foreseeable for inclusion within the mosaic construction system.

The output from the dynamic mosaic construction system is a mosaic of input images that is automatically constructed as input images are applied to the input of the system. As such, the dynamic mosaic can be constructed in real-time as, for example, video frames are generated by a video camera. As such, the mosaic is built and altered in real-time with each frame of video information being used to update the mosaic. Such a mosaic construction system finds use in many applications. Three illustrative application systems are discussed below.

B. Static Mosaic Construction System 1401

Figure 14:
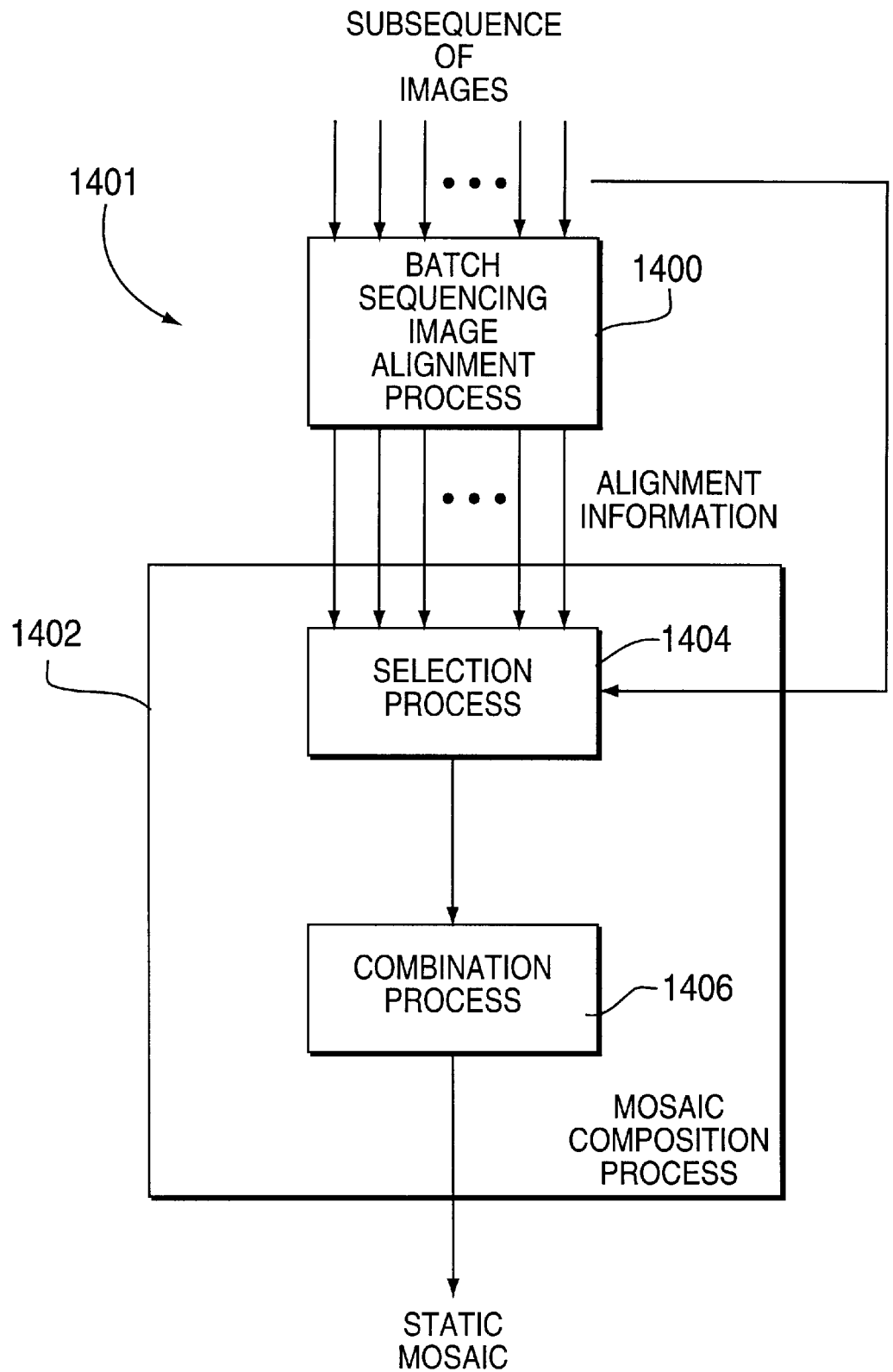
FIG. 14 depicts a detailed block diagram of a static mosaic construction system.

FIG. 14 depicts a static mosaic construction system 1401 which contains similar components to that of the dynamic mosaic construction system. Namely, the system contains an alignment process 1400 and a mosaic composition process 1402. However, the alignment process performs batch-sequence image processing. As such, the static system simultaneously processes all the images in a subsequence of images, e.g., the system uses batch sequencing. Although all the images are aligned to one another, the alignment process is identical to that which was discussed above. However, rather than coarsely aligning an image to the previous image or to a tile containing the previous image, in this static system, each image is initially coarsely aligned to its neighbor (an adjacent image) or a tile containing an adjacent image. Thereafter, the precise alignment process of FIG. 4 is executed exactly as stated above. The outcome of the alignment process is a plurality of alignment parameters, i.e., alignment parameters for each input image.

The alignment parameters are used by the mosaic composition process 1402 to combine the aligned images into a static mosaic. The mosaic composition process contains selection process 1404 and combination process 1406. These processes function similar to the processes depicted in FIGS. 5 and 6. However, note that since the mosaic is not updated, there is no feedback of the constructed mosaic back to the alignment process, as was the case in the system to construct the dynamic mosaic.

II. MOSAIC BASED DISPLAY SYSTEM 104

Figure 7:
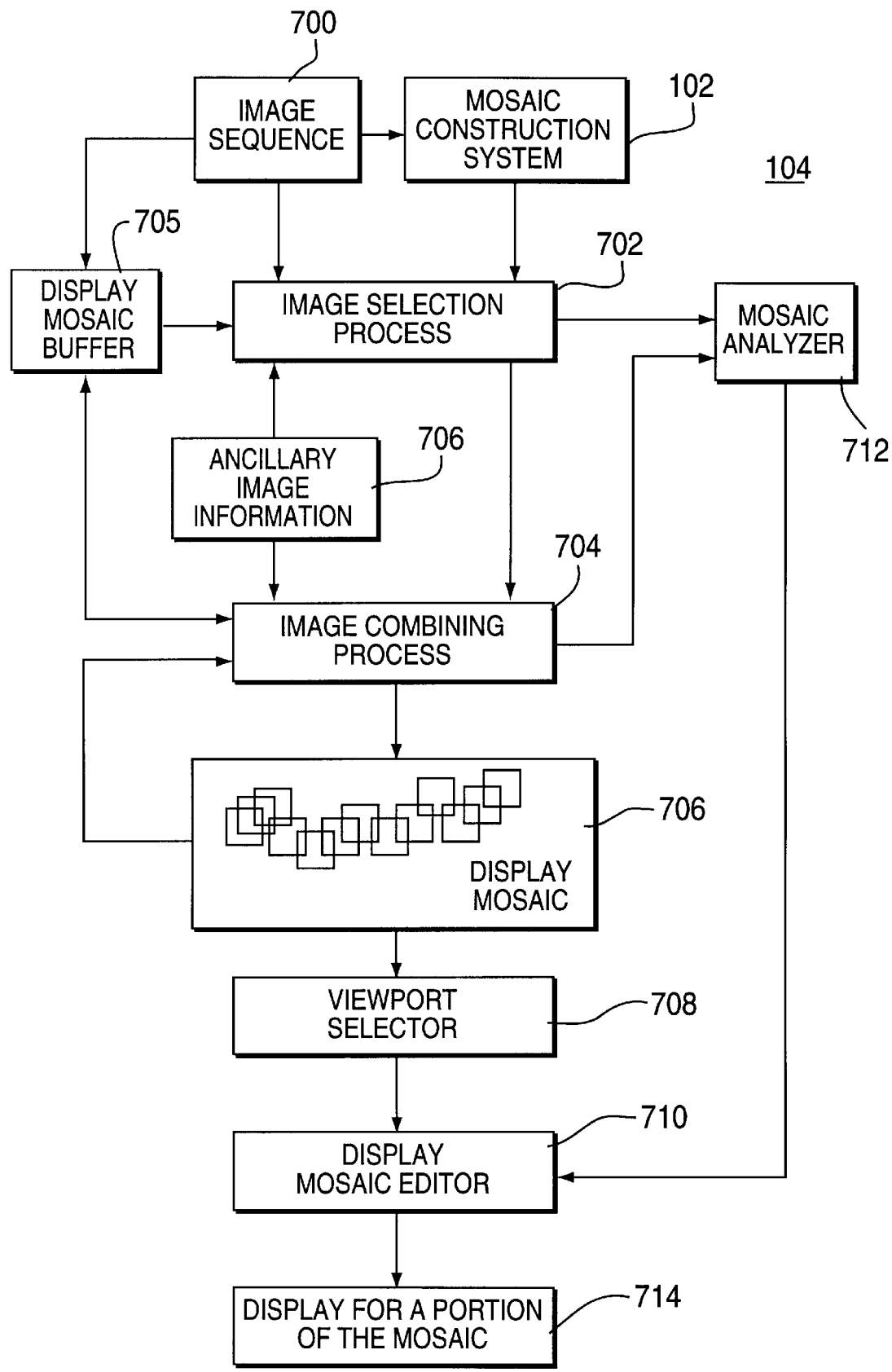
FIG. 7 depicts a block diagram of a mosaic based display system.

FIG. 7 depicts a block diagram of the mosaic based display system 104. In this system, the input images are formed into a reference mosaic using the mosaic construction system described above. As such, for each new input image, two mosaics are generated. The reference mosaic is updated with the new input image and the display mosaic is updated with the new input image. In general, these two mosaics contain the same image information; however, the display system can add additional information to the display mosaic that is unnecessary or unwanted in the reference mosaic.

Specifically, the input image sequence 700 forms an input to the reference mosaic construction system 102, to an image selection process 702 and to a display mosaic buffer 704. The reference mosaic construction system provides the image selection process 702 with the alignment information for all the input images presently comprising the reference mosaic.

The image selection process 702 and the image combining process are similar in function to the selection process 302 (or 1404) and combining process 304 (or 1406) in FIG. 3 (or FIG. 14) and described above. Therefore, these processes will not be discussed in detail, except for certain aspects that make processes 702 and 704 different from processes 302 and 304 (or 1404 and 1406). One difference is that ancillary image information 706 can be incorporated into the display mosaic. As such, the ancillary image information is supplied to both the image selection process and the image combining process. The ancillary image information may comprise highlighting of specific areas on the mosaic, color enhancing specific areas, outlining the latest input image, fading any images in the display mosaic that are "old", and the like.

Furthermore, the image combining process 704 is capable of tiling the display mosaic. By tiling, the display mosaic can be efficiently stored in a display mosaic buffer 705 as a series of sub-mosaics. These sub-mosaics can be recalled from memory, as needed, and combined with other sub-mosaics or input images to recreate any previously displayed mosaic. The alignment information for the respective sub-mosaics is stored with the sub-mosaics such that reassembly into the entire display mosaic or some portion thereof is simple. The sub-mosaics can be used to remove foreground occlusion, to view the mosaic from a previous sensor position, or to insert moving objects into the current display mosaic that actually occurred at a previous time.

The present display mosaic is temporarily stored in memory as represented by block 706. This display mosaic is updated with new input images and ancillary image information as necessary. The display mosaic can appear in one of many forms. For example, the background can be stabilized either by freezing the mosaic to a reference coordinate system or through controlled motion. In such a stabilized mosaic, foreground objects appear to freely move relative to the stabilized background. Alternatively, a foreground object can be stabilized and fixed to the center of the display while the background will appear to move past the foreground object when the foreground object is in motion. Also, the display mosaic may be constructed relative to any reference coordinate system, even a coordinate system different from that used by the reference mosaic.

At block 708, a user selects a display viewport, i.e., a portion of the display mosaic to be displayed on a computer monitor. If the selected viewport is smaller than the entire display mosaic, the viewport can be scrolled about the mosaic and/or used to zoom in or zoom out to better view certain areas within the mosaic.

Once a viewport is selected, the user can select, at step 710, one or more editing and enhancement functions. For example, the operator could highlight areas of the display, filter selected areas, cut areas of the display for placement in documents, select specific display areas for printing and the like.

In addition to image enhancement and editing, the system provides a mosaic analyzer 712 that generates selected overlays for the display mosaic. By monitoring the operation of the editing process and the combining process, the mosaic analyzer 712 generates an overlay that outlines the position of the latest input image that was added to the mosaic. The analyzer may also generate overlays that outline the motion of foreground objects within the display mosaic or to graphically indicate the motion of the sensor in a stabilized display mosaic. Additionally, overlays can be generated to indicate areas of the display mosaic that contain information that is no longer accurate or timely.

At step 714, the portion of the display mosaic within the selected viewport is presented to the user on a computer monitor or other display device. The user can manipulate the viewport in real-time such that changes to the viewport appear virtually instantaneously. Additionally, any updated information, e.g., a new input image in the viewport, that may occur in real-time is updated in real-time.

A. Image Printing System 106

The image printing system 106 generates a "hard copy" of the portion of the display mosaic within the viewport defined by the mosaic based display system. Since the display mosaic is derived within an image pyramid framework, the display mosaic has a resolution commensurate with the resolution of the computer monitor. However, the display mosaic resolution is typically not the highest resolution available. As such, a higher resolution can be used to print the images displayed within the viewport. Such high resolution printing is possible because the images have been aligned using the coarse-to-fine aligning process that accurately aligns the images at subpixel accuracy.

In operation, a user generates a display mosaic from a series of images, then selects a desired portion of the mosaic to be printed. Once the selection is made on the computer monitor, the portion of the display mosaic in the viewport is printed. Alternatively, the selected portion of the display mosaic can be produced as a photograph negative, a photographic slide, or some other "hard copy" image.

III. MOSAIC BASED COMPRESSION SYSTEM 110

The mosaic based compression system exploits the temporal and spatial redundancy within a sequence of images to achieve efficient information compression. In operation, the system generally creates a series of mosaics from subsequences of images. Typically, the input to the system is a sequence of video frames and a mosaic is created from a plurality of frames of video through one of the mosaic construction sequencing processes (FIG. 2). Thereafter, this system automatically, or under system user control, selects the mosaics that are directly encoded and which mosaics are encoded via their relationships to the other mosaics, e.g., encode both geometric and photometric relationships.

The mosaic based compression system is foreseen as useful in two distinct situations. In the first situation, the mosaic based compression system, known as the image information storage system, compresses image information for efficient storage in a storage medium in such a way that the image information can be randomly accessed, efficiently exploited, rapidly searched or browsed, and the like. In the second situation, the mosaic based compression system, known as the real-time transmission system, compresses image information for efficient transmission over a band-limited transmission channel. Although each system operates using similar principles, the storage and transmission systems are slightly different from one another. Therefore, the following discussion separately addresses each system. From the following discussion of each system, those skilled in the art will understand that a system may be designed that is a hybrid of the storage and transmission systems. A hybrid system would include aspects of both the storage and transmission systems.

A. The Storage System 800

Figure 8:
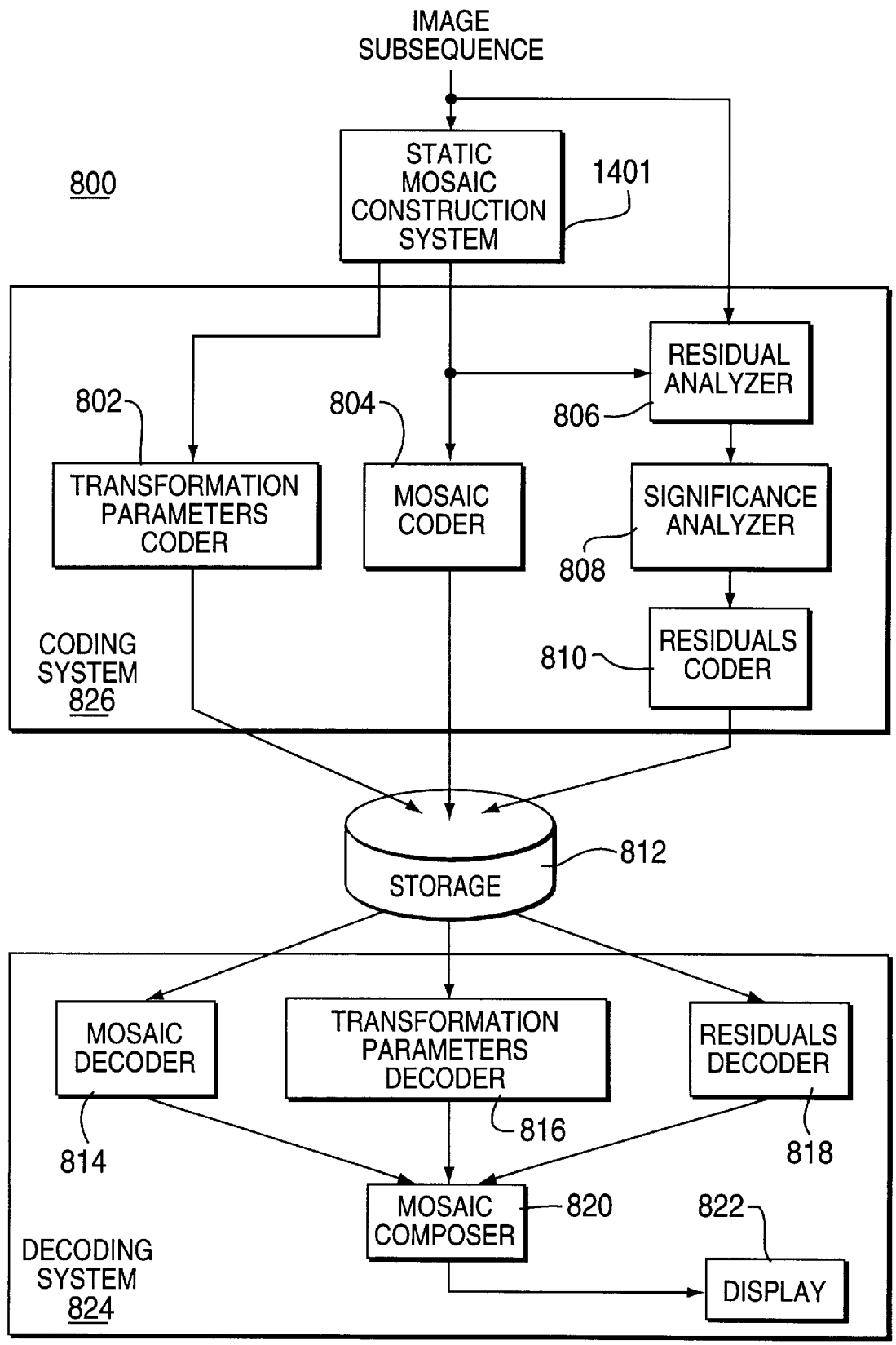
FIG. 8 depicts a block diagram of a static mosaic based compression system.

FIG. 8 depicts a block diagram of a mosaic based compression system 800 that is used to format image information for efficient storage in a storage device 812 such as a disk drive, CD-ROM, optical drive, and the like. As shall be apparent from the following discussion, the system enables a user to randomly access the image information from the storage device. Random access is generally not available in most image compression techniques that exploit temporal redundancy because the compression is accomplished using the sequence of the images, e.g., MPEG compression techniques compress a sequence of video frames and the entire sequence up to the desired frame must be reconstructed in order to access a desired frame therein.

In contrast, the present invention divides a series of images, for example a video frame sequence, into contiguous scene subsequences and a mosaic is generated for each of these scene subsequences. As such, each mosaic represents a "snapshot" view of the scene captured within the video sequence. In general, the invention codes each mosaic, its residuals and transformation parameters and stores them in a storage device. Consequently, upon review of the stored image information, i.e., when a mosaic is selected from memory, a user can easily view the mosaics and extract any individual frame within the mosaic. The transformation parameters and residuals are used to extract any one frame from the mosaic. Thus, the invention permits random frame access and a rapid search capability.

Specifically, the system contains a static mosaic construction system 1401, a coding system 826, a decoding system 824 and a storage device 812. The static mosaic construction system operates in the same manner as the static mosaic construction system depicted in FIG. 14 and discussed above. In this application, the sequence (or subsequence) of images are warped, using batch sequencing, to a reference coordinate system such that the transformations that align the images with one another are defined relative to the reference coordinate system. The output of the mosaic construction system is a mosaic containing a plurality of individual images that have been aligned and combined. Additionally, the output contains the transformation parameters for each image contained in the mosaic. The mosaic as well as the transformation parameters form inputs to the coding system 826.

The coding system 826 codes the mosaic, the transformation parameters, and the residuals such that they are efficiently stored within the storage device. Specifically, the coding system 826 contains a residual analyzer 806, a significance analyzer 808, a transformation parameters coder 802, a mosaic coder 804, and a residuals coder 810.

The residual analyzer 806 generates residuals by conventionally comparing, within a pyramid framework, an image from the mosaic to a corresponding input image. Each of the input images are compared to the mosaic to generate residuals representing moving objects in the images, changes in object illumination, image misalignment after alignment processing, intensity errors due to interpolation and noise. It is very important in transmission systems that object movement, object illumination changes, and misalignments be coded.

Since the residual analyzer produces residuals for intensity errors and noise as well as object movement, object illumination changes, and misalignments, simple image differencing by the residual analyzer does not provide an acceptable method for determining semantically significant residuals. An effective way of determining semantically significant residuals is to consider not only the residual intensity but also the magnitude of local residual motions (i.e., local misalignments). Note that the residual motion compensation need not be accurate, as it itself is not used for motion compensation, htit rather used to determine the significance of the residuals for coding purposes.

The significance analyzer 808 analyzes the residuals in view of the magnitude of the local residual motions. In essence, the significance analyzer selects which of the residuals should be coded for storage and which are not necessary for accurately recreating the mosaic upon retrieval. In other words, the magnitude of the residual motion from predicted to current mosaic determines which residuals are coded. Those residuals with no magnitude motion (insignificant) are multiplied by zero and those with some degree of magnitude motion (significant) are multiplied by a weighting function ranging from 0 to 1. The weighting function is proportional to the magnitude motion.

More specifically, to approximate the magnitudes of the residual motions, a rough estimate $S_t(x,y)$ of the normal motion flow magnitude at each pixel (x,y) at time t is computed. This is a general equation that assumes the images that are combined to form a static mosaic where captured in a time sequence. If this is not the case, then the variable t can be thought of as a variable that numbers the images in the order in which they appear in the sequence, e.g., t=1, 2, 3, and so on. The normal flow is the component of the optical flow in the direction of the spatial gradient. The flow estimate $S_t(x,y)$ is defined by:

$$S_t(x,y) = \frac{\sum_{(x_i,y_i)\in N(x,y)} |I_t(x_i,y_i) - I_t^{Pred}(x_i,y_i)|}{\sum_{(x_i,y_i)\in N(x,y)} |\nabla I_t(x_i,y_i) + C|} \quad (4)$$

where:

$I_t$ is an image at time t;

$I_t^{Pred}$ is an image in the mosaic at time t;

$\nabla I_t(x,y)$ is the spatial intensity gradient at pixel (x,y) in frame $I_t$;

N(x,y) is a relatively small neighborhood of pixel surrounding pixel (x,y) (typically a 3 by 3 pixel neighborhood); and C is used to avoid numerical instabilities and to suppress noise.

The values of $S_t$ in x-y space taken together form a significance map. The measure $S_t$ is used to select regions of interest to be coded and is also used as a multiplicative weight on the prediction error in those regions. Small values of $S_t$ can be set to zero, so that insignificant residuals need not be transmitted at all. The measure $S_t$ can be thresholded on a pixel-, region- or block-wise basis. When discrete cosine transform (DCT)-based spatial coding is used, $S_t$ is zeroed if the entire block is below threshold, but not modified if any pixel in the block is above the threshold. A typical threshold is a motion of 1 pixel. To decrease noise sensitivity, the significance map is morphologically eroded by a 3×3 structuring element before block zeroing is performed. This promotes skipping of entire blocks, avoiding bitrate penalty of coding with just a few isolated suprathreshold pixels.

The significant residuals and the mosaic are respectively sent to separate codes for coding. The codes use any conventional form of spatial encoding such as wavelet, discrete cosine transform (DCT), and the like. The transformation parameters could be spatially coded or coded using pulse code modulation (PCM) or differential PCM (DPCM).

By using a mosaic based system substantially all redundant temporal and spatial image information is removed from the stored image information and, as such, the system effectively compresses the image sequence. In essence, the static system stores information concerning the background scene and then stores any movement within the background scene as the residuals. This relationship between the input images, background information, and residuals is schematically depicted in FIG. 9.

Figure 9:
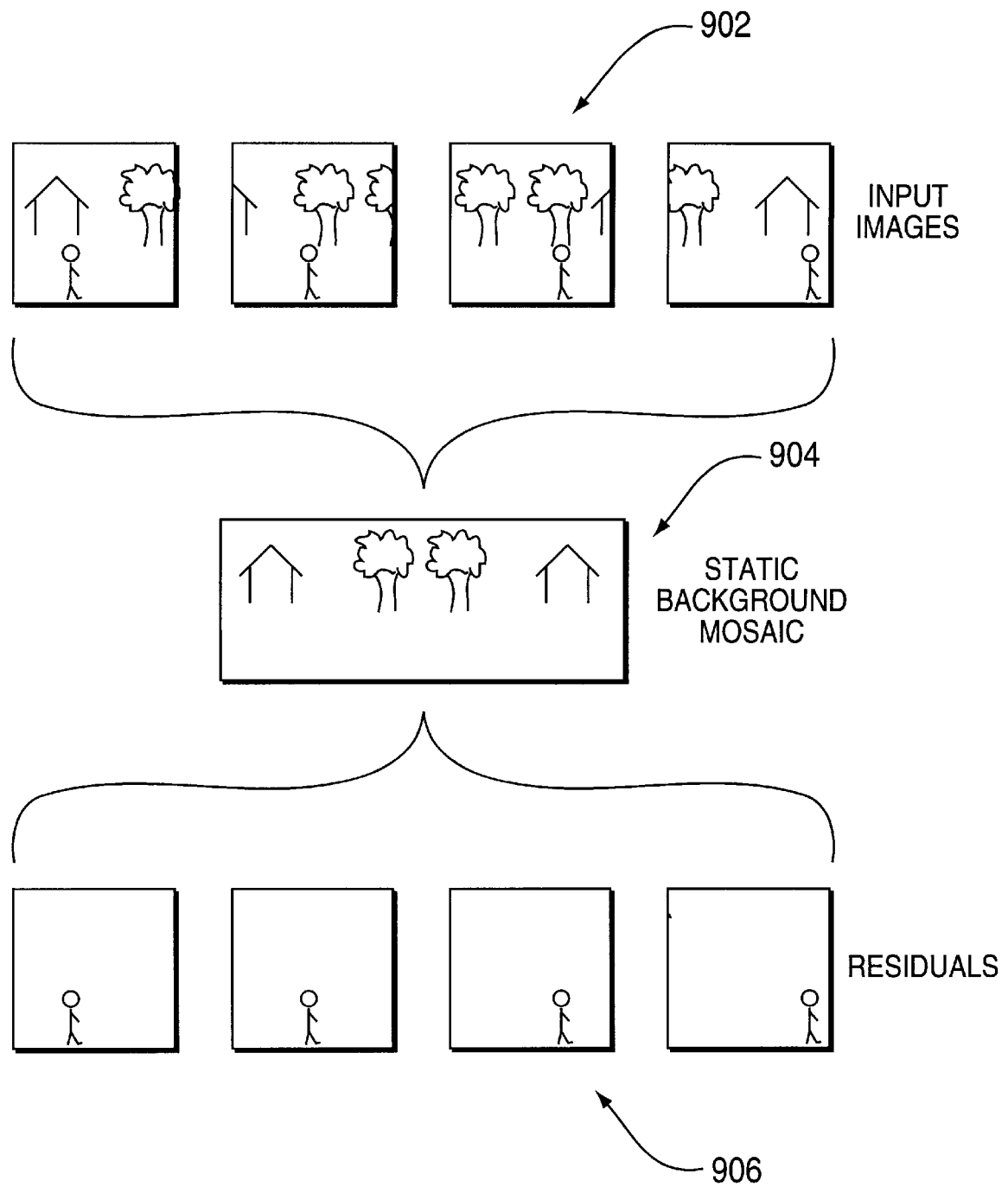
FIG. 9 depicts a schematic rendering of the relationship between input images, background information, and residuals for the static mosaic based compression system of FIG. 8.

As shown in FIG. 9, the input images 902 contain a scene of two houses and two trees that are within the camera's view as a video camera pans from left to right. The scene of interest is illustratively captured in four video frames. Additionally, a person is walking through the scene from left to right. Once the images 902 are aligned and combined using batch sequencing, a mosaic 904 containing the background is produced. The residuals 906 represent object motion relative to the background, e.g., the person walking through the scene.

Returning to FIG. 8, the information retrieval (decoding) system 824 for reconstructing the image sequences (or individual images) from the stored information contains a decoders 814, 816 and 818, a mosaic composer 820, and a display 822. Each decoder respectively retrieves from the storage device 812 the mosaic, the transformation parameters and the residuals necessary to recreate a mosaic and retrieve any image therefrom. The mosaic composer 820 combines the residuals, the mosaic and the transformation parameters to form a mosaic.

The display 822 may merely display an entire mosaic retrieved from the storage device. However, typically the display is used to select specific images, or portions thereof, within the mosaic for viewing. These are simply recovered using the transformation parameters to select the desired image and remove it from the mosaic. Furthermore, the mosaic based display system described in connection with FIG. 7 can also be used to manipulate and view the retrieved mosaics and their constituent images.

B. The Real-time Transmission System 1000

Figure 10:
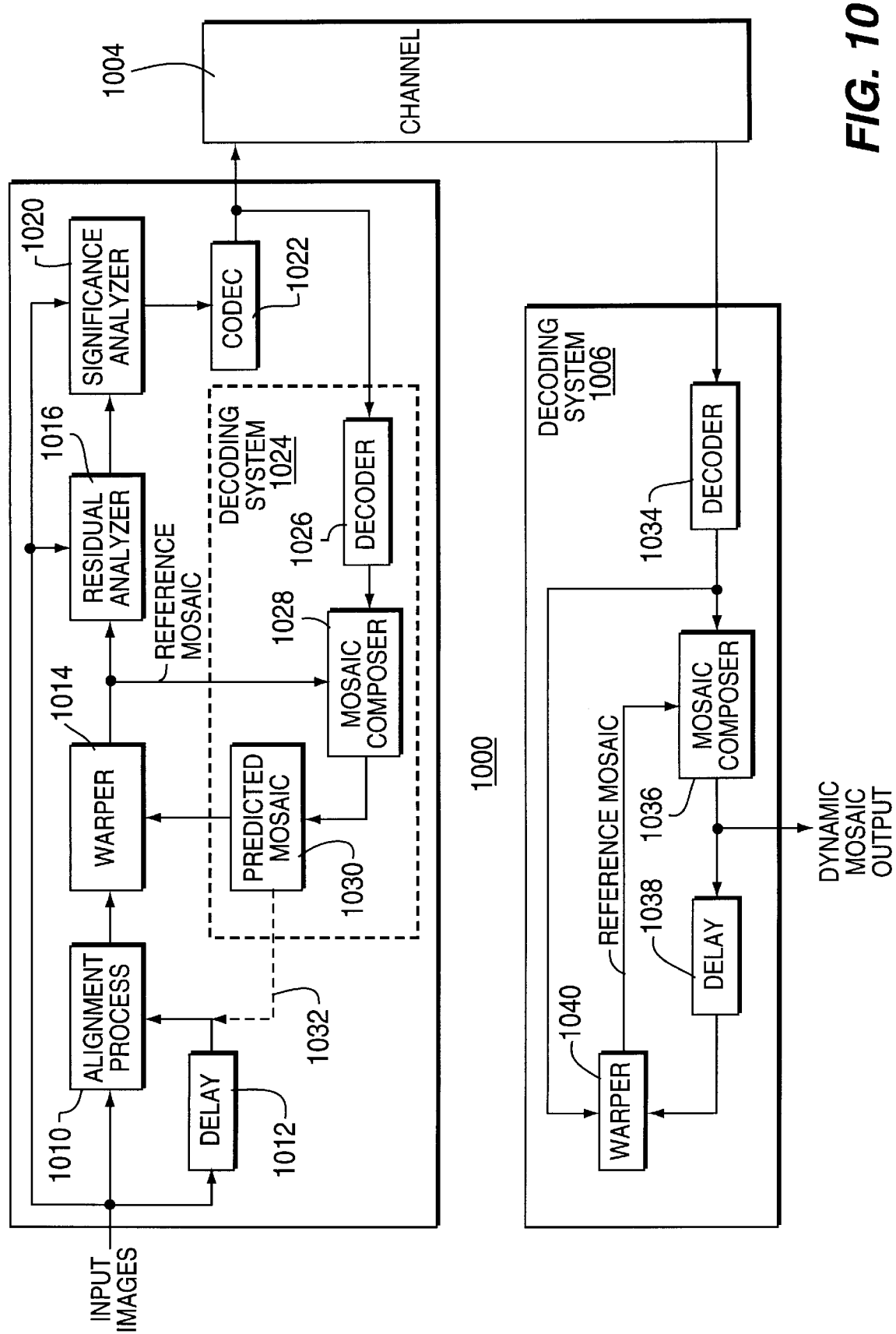
FIG. 10 depicts a block diagram of a dynamic mosaic based compression system.

FIG. 10 depicts a block diagram of a "dynamic" mosaic based compression system 1000. In general, the system contains a coding system 1002 (typically within transmitter hardware), a channel 1004 through which the coded image information is propagated, and a decoding system 1006 (typically within receiver hardware).

In the coding system 1002, the mosaic construction system (see FIG. 3) is modified to accommodate feedback of a predicted mosaic 1030 to aid in compression. Specifically, rather than aligning each new input image with the entire mosaic, each new input image is aligned only with the previous image in the input image sequence. As such, a delay 1012 is used to temporarily delay a first image in a sequence of images. An alignment processor 1010 aligns the delayed image with a second image in the sequence of images. This alignment process assumes that each consecutive image has some portion thereof that is in common with the preceding image, i.e., two consecutive images overlap. This is generally the case when the input image sequence is a series of video frames. However, if the predicted mosaic is of relatively good quality, then the input image could be aligned with the predicted mosaic (i.e., the delay 1012 is removed and the predicted mosaic is sent along dashed line 1032 to the alignment processor 1010.

The aligned input image (the most recent image) and predicted mosaic are then combined to form an updated mosaic. A conventional image warper 1014 accomplishes a warping and combining process to align and combine the mosaic and image. For this illustrative system, the mosaic construction sequencing is recursive and the reference coordinate system is defined by the input image coordinate system. This warping process also combines the latest input image with the predicted mosaic to produce an updated mosaic (reference mosaic) in the same manner that the mosaic construction system of FIG. 3 combines a mosaic and an image. As such, the term "dynamic" refers to both aspects of the mosaic; namely, the coordinate system of the mosaic and the contents of the mosaic.

The residual analyzer 1016 generates residuals by conventionally comparing the reference mosaic to the current input image within the pyramid framework. The residual analyzer 1016 and significance analyzer 1020 function the same as the residual analyzer 806 and significance analyzer 808 in the static mosaic compression system (FIG. 8). However, if thresholding is used in the significance analyzer of the dynamic mosaic compression system, the threshold levels for the dynamic system may be set lower than those in the static system.

The codec 1022 encodes the significance weighted residuals. The codec 1022 uses any conventional form of spatial encoding such as wavelet, discrete cosine transform (DCT), and the like. The coded bits are then transmitted to a receiver via the channel 1004.

The coding system 1002 includes a decoding system 1024 to generate the predicted mosaic 1030 to facilitate the dynamic compression technique. In particular, the decoding system contains a decoder 1026 and a mosaic composer 1028. The decoder 1026 generates the residuals from the encoded residuals received from the channel 1004. The mosaic composer 1028 constructs the predicted mosaic by combining the residuals with the reference mosaic used in the coding process. Since the system contains a feedback loop (i.e., coding and encoding within the coding system) for utilizing a predicted mosaic as an input to the warper 1014, the system improves the predicted mosaic over time. Note that the predicted mosaic 1030 is identical to the mosaic that is generated at the receiver. Thus improving the predicted mosaic also improves the received mosaic. Furthermore, such improvement of the received mosaic can be accomplished selectively. For example, if a specific region of interest in the input image is selected by zooming, the system transmits a series of residuals representing image changes at a higher resolution than when an entire mosaic is transmitted. As such, that selected region in the received mosaic (and the predicted mosaic) will have improved quality as compared to the remainder of the mosaic.

The decoding system 1006 contains a decoder 1034, a mosaic composer 1036, a delay 1038, and a warper 1040. The decoder 1034 generates residuals from the received information. These residuals are used by the mosaic composer 1038 to compose and update a received mosaic. The received mosaic forms the output of the decoding system 1006. Additionally, the received mosaic is delayed (e.g., by one video frame in a video transmission system) by delay 1038. The warper 1040 warps the delayed mosaic to the next decoded set of residuals. This warped mosaic forms a reference mosaic that the mosaic composer updates with subsequently received residuals.

To further improve the compression efficiency, the fact that the various mosaics and input images are decomposed into image pyramids during the processing is used to implement a resolution prioritization scheme. As such, the coding system can encode residuals initially from the pyramid levels having the lowest resolution, then the residuals from the higher resolution levels can be coded and transmitted. Such a scheme is known as progressive transmission. Alternatively, the residuals generated from higher and lower resolution levels of the mosaic and input images can be transmitted depending upon the availability of transmission bandwidth.

C. Extensions Of The Compression Systems

1. Layered Transmission (Storage) Approach

Since the input images can be decomposed into a background mosaic and independent moving objects (foreground information), these separate portions of a scene can organized into separate mosaics. For example, in FIG. 9, the background is shown as a mosaic, but the residuals can also be combined into a mosaic of the moving object. Each mosaic can then be coded and transmitted separately. Thereafter, only the motion parameters that describe how the moving object mosaic moves relative to the background mosaic need be coded and transmitted. As such, less bandwidth is needed for transmitting the image information.

2. Three-dimensional Parallax Motion Encoding

A three-dimensional representation of an image is based upon the observation that the two-dimensional alignment of a dominant surface (e.g., background scene) removes all the motion due to camera rotations and other camera induced deformations to the image (e.g., changes in zoom, lens distortion, camera jitter, and the like) as well as the effects of camera translation on the dominant surface. The remaining motion within a fixed scene is purely due to a combination of camera translation relative to the scene and a distance of the object and surfaces in the scene from the dominant surface. This remaining motion is parallax motion.

Since the three-dimensional structure is typically invariant over time (at least over the duration of several seconds or minutes), the structure can be represented as a single static image that can be used to predict the parallax motion over the duration of invariance. This parallax based three-dimensional representation is referred to as a "height" map, since the representation is directly related to the distance or "height" of objects and surfaces relative to the dominant surface. The height map together with the computed translational motion of the camera between successive images can be used to predict the motion of all points between images, relative to the mosaic surface representing the dominant surface.

The computation of the two-dimensional representation plus the three-dimensional height information involves the following steps. First, each image is aligned to the mosaic coordinate system using the two-dimensional alignment discussed previously. Second, the residual parallax motion of the objects and stirfaces within the scene are computed. The residual parallax motion is computed while assuming that all camera rotations and other camera induced image deformations have been removed (e.g., these deformations are assumed to be included in the two-dimensional mosaic or the dominant surface). As such, only the effects of translation remain. Third, the residual parallax motion is decomposed into "heights" and camera translation. Forth, the height information is integrated from multiple frames into a single height map mosaic for the scene. This integration can be accomplished using batch sequencing or recursive sequencing of the image frames. In operation, this process can predict a given image frame from the mosaic of the dominant surface and the height mosaic. As such, the height information can be coded and transmitted (or stored) only once, after that, only camera motion needs to be coded and transmitted. As a result, the images can be restored at the receiver (or upon retrieval) and include parallax motion in the reconstructed images.

3. Temporal Pyramids

Figure 11:
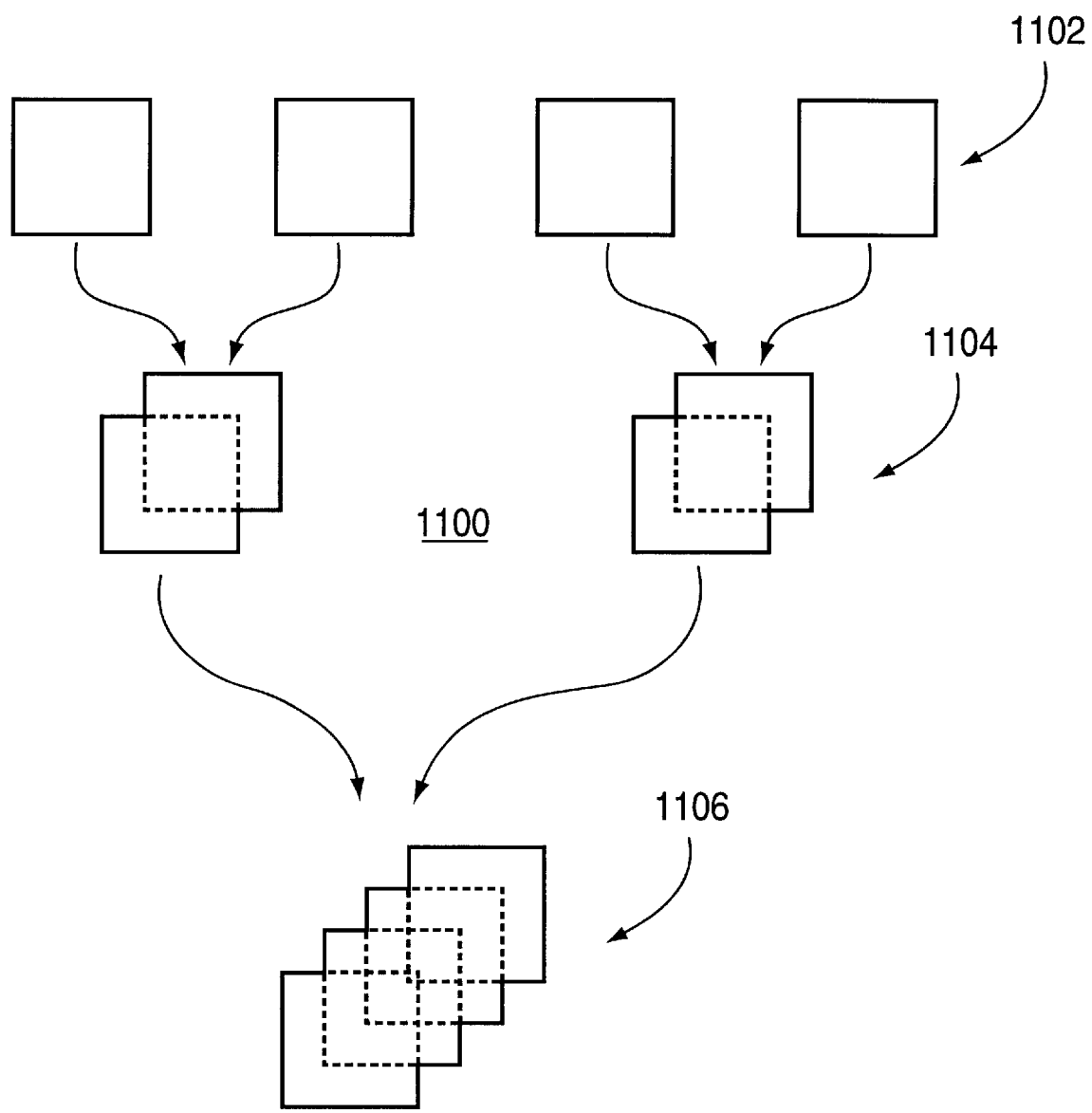
FIG. 11 depicts a schematic rendering of a temporal pyramid.

The mosaic based compression systems do not remove as much short-term temporal redundancy of moving objects as is removed by conventional interframe prediction systems. For example, when an object appears in a scene, but not in the mosaic, similar residuals are coded repeatedly in a number of image flames. To improve the temporal redundancy removal in the static system, the system can be modified to process a hierarchy of mosaics whose levels correspond to different amounts of temporal integration. FIG. 11 depicts a schematic diagram of this hierarchy of mosaics 1100. The finest level 1102 in the hierarchy contains the original images and other levels 1104 and 1106 contain static mosaics integrated from images or mosaics of the next finer level. Only the residuals between levels need be coded and stored. The result is a representation which achieves temporal decorrelation in a manner analogous to spatial Laplacian pyramids.

4. Selective Memory

A dynamic system using the coordinate system of the input image as the reference coordinate system, requires the mosaic to be warped over and over again to the coordinate system of each input image. Such repeated warping of the mosaic will, over time, lead to excessive blurring of the image depicted in the mosaic. In order to avoid this blurring, the dynamic mosaic is generated using a selective memory scheme. The selective memory scheme predicts each pixel of the current image with a pixel from the most recent occurrence of the scene point without incurring the blurring introduced by repeated warping. In order to achieve this, the source of each prediction is a previously received image in its original coordinate system. To avoid storing all the previous input images, the decoder (within the transmitter) maintains a segmented or "tiled" representation of the mosaic, keeping only the most recent occurrences of the imaged scene. As such, each mosaic tile is only warped a limited number of times before another tile is used, e.g., a tile becomes old and it is no longer necessary to warp it to an input image. Consequently the mosaic does not become blurred.

IV. SURVEILLANCE SYSTEM 108

Figure 12:
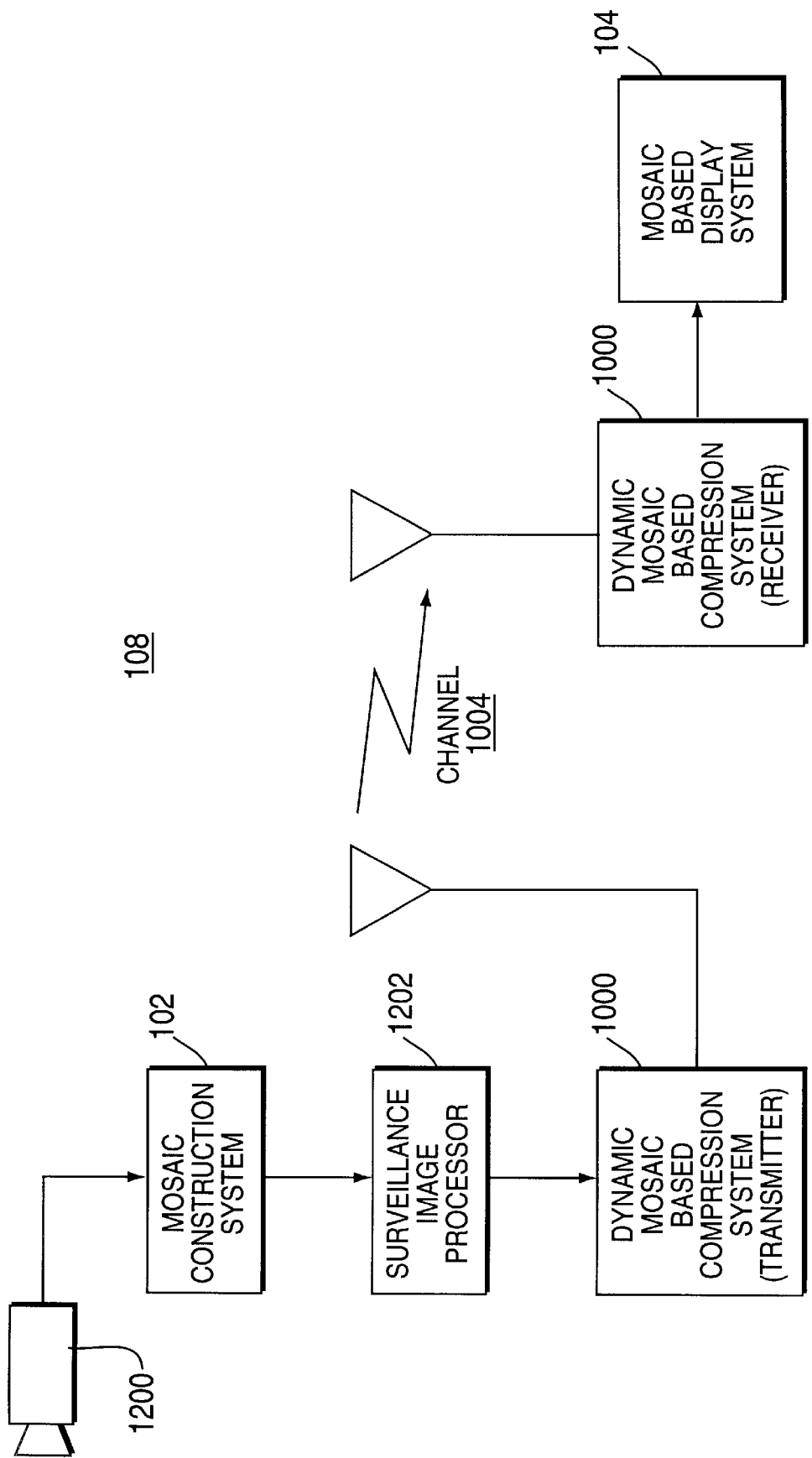
FIG. 12 depicts a block diagram of a surveillance system.
Figure 13:
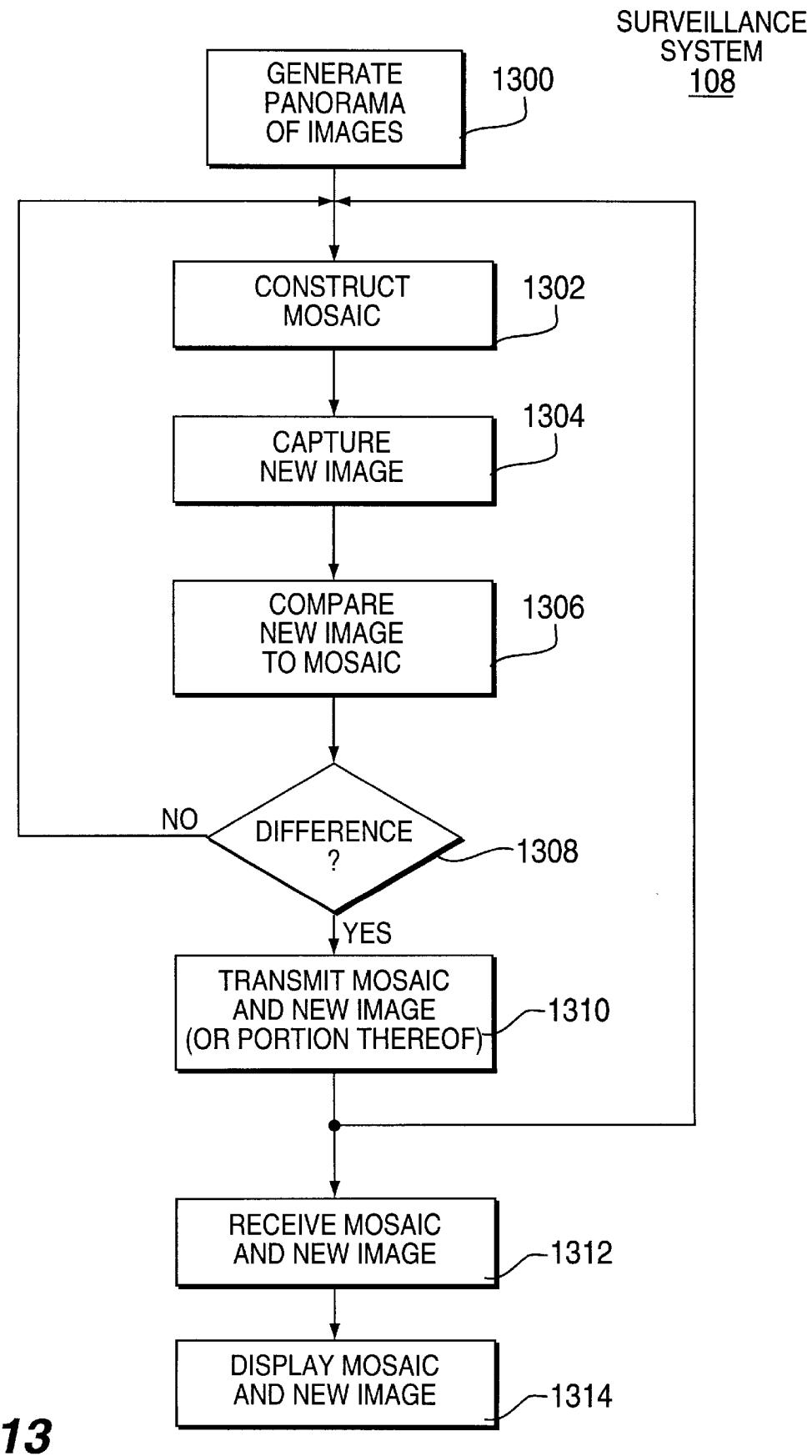
FIG. 13 depicts a flow chart of the operative process of the surveillance system of FIG. 12.

FIG. 12 depicts a block diagram of an illustrative surveillance system 108 incorporating the mosaic construction system 102. The method of operation of the surveillance system is outlined in the flow chart of FIG. 13. To best understand the surveillance system, the reader should simultaneously consult both FIGS. 12 and 13.

The surveillance system 108 may be located at a location that is remote from a system user. In that instance, the surveillance system (as shown) includes a mosaic based compression system 1000 and a mosaic based display system 102. If a system user is co-located with the sensor and surveillance system, then the compression system is, of course, not required.

The surveillance system 108 receives, at step 1300, a series of images from a sensor 1200 such as a video camera. The series of images represents a panoramic view captured by the sensor. At step 1302, the system utilizes the mosaic construction system 102 to produce a mosaic from the images in the panoramic view. This construction can be accomplished using recursive or batch sequencing. The panoramic mosaic is a very high resolution image. At step 1304, the sensor generates a new image. At step 1306, using a surveillance image processor 1202, the new image is compared to the present mosaic to determine if any differences are evident. Since the mosaic and the input image are high resolution images, the detection process is very accurate. At step 1308, the system queries whether a difference is detected. If no differences are found, the system accepts another input image from the sensor 1200 and repeats the comparison. However, if a difference is detected, a lower resolution version of the mosaic used in the detection process and the difference (the new input image) are coded, at step 1310, by a mosaic based compression system 1000 (transmitter half). The coded information is transmitted over a communications channel 1004, e.g. a radio channel. After transmission of the information, the process returns to the mosaic construction system to update the mosaic.

A receiver containing the decoding system of the mosaic based compression system 1000 decodes, at step 1312, the image information. The decoded information is then displayed, at step 1314, to a system user via a mosaic based display system 104. The user can then analyze the image difference information to determine if it is relevant, e.g., enemy movement on a battlefield, a burglar entering a warehouse, and the like. The user can then take appropriate action.

Once the panoramic mosaic is transmitted, the transmitter need only send changes to the mosaic. e.g., only send the regions of change. The receiver will update its mosaic with changes such that it always can show the user the current scene at the camera site.

Although various embodiments which incorporate the teachings of the present invention have been shown and described in detail herein, those skilled in the art can readily devise many other varied embodiments that still incorporate these teachings.

What is claimed is:

1. A data storage system for compressing image information for storage in a storage device, said system comprising:

means for dividing a series of images into a plurality of subsequences of images;

a batch sequencer, connected to said dividing means, for batch sequencing each of said subsequences of images to align each image in each of said subsequences with a reference coordinate system and to combine each aligned image with other aligned images in each of said subsequences to generate a static mosaic, transformation parameters and residuals;

a coder, connected to said batch sequencing means, for coding said static mosaic, said alignment parameters and said residuals;

storage means, connected to said coder, for storing said coded static mosaic, coded transformation parameters and coded residuals.

2. The system of claim 1 wherein said coder further comprises:

a residual analyzer for comparing an image from the mosaic to an image from said subsequence of images and generating residuals in response to said comparison;

a significance analyzer for selecting particular residuals for coding;

a transformation parameters coder for coding the transformation parameters;

a mosaic coder for coding the mosaic; and a residuals coder for coding the selected residuals.

3. The system of claim 1 further comprising a decoder for retrieving and decoding said coded mosaic, said coded transformation parameters and said coded residuals to reconstruct said images in said subsequence of images.

4. A communication system for compressing image information for transmission, said mosaic based compression system comprising:

means for aligning an input image to a predicted mosaic;

means for combining said aligned input image with said predicted mosaic to create a reference mosaic;

a residual analyzer, connected to said combining means, for comparing said input image to said reference mosaic and generating residuals in response to said comparison;

a significance analyzer, connected to said residual analyzer, for selecting particular residuals for coding;

a codec, connected to said significance analyzer, for coding said selected residuals;

a transmitter, coupled to said codec, for transmitting said coded residuals through transmission channel; and a receiver, coupled to said transmission channel, for receiving said coded residuals and constructing a received mosaic containing said input image.

5. The mosaic based compression system of claim 4 further comprising:

a decoder, connected to said codec, for decoding said coded selected residuals and creating said predicted mosaic.

6. A mosaic based compression system for compressing image information within a series of images, said system comprising:

an image processor for aligning each image of said series of images with a reference coordinate system and for combining each aligned image with other aligned images to generate a mosaic and transformation parameters;

a coder, connected to said image processor, for coding said mosaic and said transformation parameters to produce data that is a compressed representation of image information contained in said series of images.

7. The mosaic based compression system of claim 6 wherein said coder further comprises:

a residual analyzer for comparing an image from the mosaic to an image from said subsequence of images and generating residuals in response to said comparison;

a significance analyzer for selecting particular residuals for coding;

a transformation parameters coder for coding the transformation parameters;

a mosaic coder for coding the mosaic; and a residuals coder for coding the selected residuals.

8. The mosaic based compression system of claim 7 further comprising a decoder for retrieving and decoding said coded mosaic, said coded transformation parameters and said coded residuals to reconstruct said images in said sequence of images.

9. The mosaic based compression system of claim 6 wherein said coder does not code any residuals to form a compressed image sequence that is time-invariant.

10. The mosaic based compression system of claim 6 wherein said mosaic is a static mosaic.

11. The mosaic based compression system of claim 6 wherein said mosaic is a dynamic mosaic.

12. The mosaic based compression system of claim 6 wherein said mosaic is selected from one of a plurality of mosaics, where each mosaic in said plurality of mosaics represents a scene layer.

13. The mosaic based compression system of claim 12 wherein a scene layer represents a planar region of an imaged scene containing objects at a particular depth within the scene.

14. The mosaic based compression system of claim 13 wherein at least one scene layer contains background information that is used to form a static mosaic and at least one scene layer contains foreground information that is used to form a dynamic mosaic.

15. The mosaic based compression system of claim 6 wherein said image processor produces residual parallax motion information and said coder codes said residual parallax motion information.

16. A mosaic based compression system for compressing image information using a dynamic mosaic, said mosaic based compression system comprising:
   an image processor for aligning an input image to a predicted mosaic and for combining said aligned input image with said predicted mosaic to create a reference mosaic;
   a residual analyzer, connected to said image processor, for comparing said input image to said reference mosaic and generating residuals in response to said comparison;
   a significance analyzer, connected to said residual analyzer, for selecting particular residuals for coding;
   a codec, connected to said significance analyzer, for coding said selected residuals to form data containing compressed image information from said input image and said predicted mosaic.

17. The mosaic based compression system of claim 16 further comprising:
   a decoder, connected to said codec, for decoding said coded selected residuals and creating said predicted mosaic.

18. The mosaic based compression system of claim 16 wherein said image processor further comprises:
   means for producing a temporal pyramid for said input image and said predicted mosaic; and
   means for aligning said input image and said predicted mosaic on a pyramid level-by-level basis.

19. The mosaic based compression system of claim 18 wherein only residuals between levels are coded.

20. The mosaic based compression system of claim 16 wherein said mosaic is selected from one of a plurality of mosaics, where each mosaic in said plurality of mosaics represents a scene layer.

21. The mosaic based compression system of claim 20 wherein a scene layer represents a planar region of an imaged scene containing objects at a particular depth within the scene.

22. The mosaic based compression system of claim 21 wherein at least one scene layer contains background information that is used to form a static mosaic and at least one scene layer contains foreground information that is used to form a dynamic mosaic.

23. The mosaic based compression system of claim 16 wherein said image processor produces residual parallax motion information and said coder codes said residual parallax motion information.

24. The mosaic based compression system of claim 16 further comprising:
   means for storing each original image that is used to form said predicted mosaic; and
   means for selectively recalling each original image to use to form said predicted mosaic for aligning with said input image.

25. The mosaic based compression system of claim 16 further comprising:
   means for storing each original image that is used to form said predicted mosaic; and
   means for tiling said mosaic into a plurality of tiles;
   means for selecting original image information from said original image corresponding to each tile whenever said input image corresponds to a particular tile;
   means for selectively recalling original image information corresponding to said tile to use to form said predicted mosaic for aligning with said input image.

26. A method of compressing image information within a series of images comprising the steps of:
   aligning each image within said series of images with a reference coordinate system;
   combining each aligned image with other aligned images to generate a mosaic and transformation parameters;
   coding said mosaic and said transformation parameters to produce data that is a compressed representation of image information contained in said series of images.

27. The method of claim 26 wherein said coding step further comprises the steps of:
   comparing an image from the mosaic to an image from said subsequence of images and generating residuals in response to said comparison;
   selecting particular residuals for coding;
   coding the transformation parameters;
   coding the mosaic; and
   coding the selected residuals.

* * * * *

UNITED STATES PATENT AND TRADEMARK OFFICE
CERTIFICATE OF CORRECTION

PATENT NO. : 5,991,444
DATED : November 23, 1999
INVENTOR(S) : Peter J. Burt, Michal Irani, Stephen C. Hsu, Padmanabhan Anandan, Michael W. Hansen It is certified that error appears in the above-identified patent and that said Letters Patent is hereby corrected as shown below:

In the specification, Column 1, after line 12, insert the following section:

--GOVERNMENT RIGHTS IN THIS INVENTION

This invention was made with U.S. government support under contract number DAAA-93-C-0016. The U.S. government has certain rights in this invention.--

Signed and Sealed this

Eleventh Day of July, 2000

Attest:

Q. TODD DICKINSON

Attesting Officer

Director of Patents and Trademarks